United States Patent [19]

Hancock et al.

[11] Patent Number: 4,850,269

[45] Date of Patent: Jul. 25, 1989

[54] LOW PRESSURE, HIGH EFFICIENCY CARBONATOR AND METHOD

[75] Inventors: Mark W. Hancock; Marvin M. May, both of Los Angeles, Calif.

[73] Assignee: Aquatec, Inc., North Hollywood, Calif.

[21] Appl. No.: 68,018

[22] Filed: Jun. 26, 1987

[51] Int. Cl.[4] .......................... B29D 1/00; A13F 3/00

[52] U.S. Cl. .............................. 99/323.1; 261/140.1; 261/DIG. 7

[58] Field of Search .................... 99/323.1, 323.2, 275; 261/DIG. 7, 140.1; 62/389

[56] References Cited

U.S. PATENT DOCUMENTS

| | | | |
|---|---|---|---|
| 27,274 | 1/1872 | Mattingly | 128/66 |
| 27,775 | 4/1860 | Chamberlain . | |
| 780,714 | 1/1905 | Ferry . | |
| 1,115,980 | 11/1914 | Sleeper . | |
| 1,126,662 | 1/1915 | Stuhler . | |
| 1,872,462 | 8/1932 | Johnson et al. . | |
| 2,183,561 | 12/1939 | Hamblin | 261/76 |
| 2,391,003 | 12/1945 | Bowman | 261/93 |
| 2,560,526 | 7/1951 | Thompson | 261/26 |
| 2,588,677 | 3/1952 | Welty et al. | 261/27 |
| 2,604,310 | 7/1952 | Brown | 261/35 |
| 2,674,263 | 4/1954 | Rupp et al. | 137/604 |
| 2,708,533 | 5/1955 | Nicholas | 222/146 |
| 2,735,370 | 2/1956 | Lance . | |
| 2,735,665 | 2/1956 | Lance | 261/27 |
| 2,750,076 | 6/1956 | Welty et al. | 222/129.1 |
| 2,798,135 | 7/1957 | Graham | 200/152 |
| 2,823,833 | 2/1958 | Bauerlein | 222/129.2 |
| 2,894,377 | 7/1959 | Shikles, Jr. et al. | 62/306 |
| 2,988,343 | 6/1961 | Edwards et al. | 261/25 |
| 3,199,738 | 8/1965 | Cary et al. | 222/129.2 |
| 3,225,965 | 12/1965 | Jacobs et al. | 222/129.1 |
| 3,292,822 | 12/1966 | Crowder et al. | 222/129.1 |
| 3,382,897 | 5/1968 | Skiera et al. | 141/107 |
| 3,397,870 | 8/1968 | McCann et al. | 261/19 |
| 3,408,053 | 10/1968 | Vantroba | 261/27 |
| 3,495,803 | 2/1970 | Schoepe et al. | 251/25 |
| 3,552,726 | 1/1971 | Kraft | 261/50 |
| 3,618,905 | 11/1971 | Primue | 261/153 |
| 3,688,950 | 9/1972 | Parish | 222/146 R |
| 3,726,102 | 4/1973 | Parks | 62/70 |
| 3,756,473 | 9/1973 | Donahue, Jr. | 222/129.2 |
| 3,756,576 | 9/1973 | Tremolada | 261/35 |
| 3,761,066 | 9/1973 | Wheeler | 261/DIG. 7 |
| 3,809,292 | 5/1974 | Booth et al. | 222/146 |
| 3,926,102 | 12/1975 | De Lepeieire | 98/102 |
| 3,926,342 | 12/1975 | Selvia et al. | 222/129.1 |
| 4,068,010 | 1/1978 | Karr | 426/477 |
| 4,093,681 | 6/1978 | Castillo et al. | 261/122 |
| 4,108,167 | 8/1978 | Hickman et al. | 128/66 |
| 4,148,334 | 4/1979 | Richards | 137/389 |
| 4,173,178 | 11/1979 | Wieland | 99/323.1 |
| 4,205,599 | 6/1980 | Franzosi | 99/323.1 |
| 4,216,885 | 8/1980 | Sedam | 222/481 |
| 4,222,825 | 9/1980 | Eisden | 203/11 |
| 4,225,537 | 9/1980 | Martonffy | 261/70 |
| 4,229,634 | 10/1980 | Hickman et al. | 200/302 |
| 4,242,061 | 12/1980 | Hartley | 417/536 |
| 4,302,186 | 11/1981 | Cammack et al. | 433/80 |
| 4,304,736 | 12/1981 | McMillin et al. | 261/35 |
| 4,316,409 | 2/1982 | Adams et al. | 99/275 |
| 4,359,432 | 11/1982 | Sedam et al. | 261/26 |
| 4,401,607 | 8/1983 | Child et al. | 261/121 |
| 4,422,371 | 12/1983 | Child et al. | 99/323.1 |
| 4,440,318 | 4/1984 | Berger | 222/129.1 |
| 4,466,342 | 8/1984 | Basile et al. | 99/323.1 |

(List continued on next page.)

FOREIGN PATENT DOCUMENTS

| | | | |
|---|---|---|---|
| 2340249 | 2/1975 | Fed. Rep. of Germany . |
| 2647597 | 6/1977 | Fed. Rep. of Germany . |
| 84000671 | 3/1984 | United Kingdom . |

*Primary Examiner*—Robert W. Jenkins

*Attorney, Agent, or Firm*—A. C. Smith

[57] ABSTRACT

An improved method and means for carbonating water includes an inexpensive pressure vessel that operates at low fluid pressures, and that is selectively vented of accumulated atmospheric gases to maintain high carbonating efficiency. Supplemental gasification of the dispensed liquid and selective cooling techniques used on the inlet water and on the carbonator promote high-level carbonation on low volume usage of pressurized carbon dioxide gas. Post-mix apparatus and method produce flavored soft drinks with only minimum additional equipment.

25 Claims, 17 Drawing Sheets

U.S. PATENT DOCUMENTS

| | | | |
|---|---|---|---|
| 4,475,448 | 10/1984 | Shoaf et al. | 99/323.1 |
| 4,509,569 | 4/1985 | Adolfsson | 141/360 |
| 4,518,541 | 5/1985 | Harris | 261/27 |
| 4,564,483 | 1/1986 | Jeans | 261/64 |
| 4,588,536 | 5/1986 | Adolfsson | 261/DIG. 7 |
| 4,597,509 | 7/1986 | Pereira | 222/129 |
| 4,629,589 | 12/1986 | Gupto et al. | 261/DIG. 7 |
| 4,632,275 | 12/1986 | Parks | 222/25 |
| 4,635,824 | 1/1987 | Gaunt et al. | 222/129.1 |
| 4,655,124 | 4/1987 | Child | 99/323.2 |
| 4,659,520 | 4/1987 | Tarver | 261/25 |
| 4,660,741 | 4/1987 | Kirschner et al. | 222/1 |
| 4,703,870 | 11/1987 | Sedam | 222/66 |
| 4,708,827 | 11/1987 | McMillin | 261/DIG. 7 |
| 4,719,056 | 1/1988 | Scott | 261/DIG. 7 |
| 4,729,495 | 3/1988 | Matthias et al. | 222/56 |
| 4,742,939 | 5/1988 | Galockin | 222/68 |

LOW PRESSURE, HIGH EFFICIENCY CARBONATOR AND METHOD

RELATED CASES

The subject matter of this application is related to the subject matter in pending application ser. No. 068,017, entitled "Improved Drink Dispenser and Method of Preparation", filed June 26, 1987, , by Mark W. Hancock and Marvin M. May, and in pending application Ser. No. 067,803, entitled "Gas-Driven Carbonator and Method", filed June 26,1987, by Mark W. Hancock and Marvin M. May, which are in corporated herein by reference.

BACKGROUND OF THE INVENTION

Field of Invention

This invention relates to carbonating liquids and more particularly to improved means to prepare substantially continuous supplies of carbonated water at low gas and liquid operating pressures.

Post-mix carbonators for commercial applications are described in the literature (see, for example, Lance, U.S. Pat. No. 2,735,665 and Welty et al, U.S. Pat. No. 2,588,677). Such commercial carbonators commonly include a rotary-vane pump with a ¼ hp. or larger motor, and a welded stainless-steel pressure vessel. The weights of such systems are generally 24 pounds or more. Such post-mix carbonating systems commonly operate with inlet gas pressures of 90 to 110 psi for ambient temperature carbonation. The pump usually supplies liquid to the pressure vessel at pressures generally of the 130 order of pounds per square inch (psi) or greater. Welty, et al, cited above, discloses a gas supply pressure of 80 psi and a liquid supply pressure of 120 to 140 psi, and Lance discloses a gas supply pressure of 100 psi and a liquid supply pressure near 135 psi. Parks in U.S. Pat. No. 4,632,275 discloses liquid supply pressures typically 150–175 pounds in post-mix fountain drink equipment. Commercial equipment embodying the subject matter disclosed in these patents commonly use stainless steel as the material of choice for both the pressure vessel and associated fittings. Such high fluid pressures require costly materials and often preclude the use of inexpensive plastic components.

Another disadvantage of such conventional systems is that the rotary-vane pump is readily destroyed when the input water supply is interrupted while the pump is running. Such a condition can be attributable to an interruption in the municipal water supply for plumbing repairs, or to clogged inlet filters, or the like, and can damage interior pump parts in a short time, resulting in costly repairs and lost beverage sales. While sensors are available to prevent pump damage, these also add incremental cost to the system.

A further disadvantage of conventional systems is the difficulty of separating the pump and the carbonator. Such separation is desirable in applications where safety factors or noise or system centralization is a consideration. System separation is presently accomplished by placing both pump and carbonator in a remote location and by running soda lines to cold plates or other cooling means close to the point of dispensing.

An inherent disadvantage of this arrangement is the tendency of the soda water to decarbonate between the carbonator and the cooling and dispensing location. The situation is exacerbated by routing the connecting soda lines through warm environments. Although decarbonation may be avoided by separating the pump and motor physically from the carbonator the need to install electrical wiring between the two locations makes this option cumbersome and economically undesirable. The need for electrical wiring between the pump and the carbonator also makes it difficult to take advantage, particularly in cold plate installations, of the lower operating pressures possible when the carbonator is supplied with cooled inlet water and immersed in a cooled environment.

Low-pressure carbonators are disclosed in the literature (see, for example, Jacobs et al, U.S. Pat. No. 3,225,965 and Parks, U.S. Pat. No. 3,726,102). These devices operate at or below freezing temperatures and have means to continuously recirculate or otherwise agitate the fluid to be carbonated. While both devices are highly efficient, neither is well suited to post mix or home beverage applications. Further, the low temperatures involved are difficult to achieve in standard post-mix equipment which are in current use.

Another known carbonating apparatus uses carbon dioxide to drive a pump to propel the liquid to be carbonated into a carbonator storage vessel maintained at 25 psi. (See, for example, McMillin, et al, U.S. Pat. No. 4,304,736). Such apparatus is intended to be operated at 0 degrees Celsius, but, both liquid and gas pressures just upstream from the carbonating vessel are near 120 psi.

Still another known low-pressure carbonating apparatus (available from Booth, Inc. of Dallas, Tex.) operates at low gas pressure and liquid pressures. The apparatus includes a dry refrigeration system, a large stainles steel carbonator tank, several syrup tanks, and means for plumbing the unit to a municipal water supply. A disadvantage of this apparatus is inefficient on-line carbonation. Therefore, system performance relies to a substantial degree on carbonation over time by natural absorption and a large reserve supply of soda water carbonated by this process. A further disadvantage of such apparatus is its inability to maintain efficient performance after dispensing several gallons of soda water due to the accumulation of atmospheric gases, as further described hereinafter.

Attempts have been made to introduce carbonators into home refrigerators as post-mix beverage carbonation systems (See, for example, Shikles, Jr. et al, U.S. Pat. No. 2,894,377 and Sedam et al, U.S. Pat. No. Re. 32,179). Difficulties with these systems include relatively large size and high production cost. Such systems include means for storing syrup flavorings and dispensing them simultaneously with carbonated water produced by the system. The syrup storage and dispensing increase both the refrigerator space required and the complexity and cost of the system. With refrigerator shelf space at a premium, the space taken up by such systems reduces flexibility and food storage options available within the refrigerator. The system of Sedam et al represents a considerable advancement in the state of the art but includes several disadvantages. This system relies upon a feed reservoir that must be filled with water as a manual operation requiring some effort and forethought on the part of the user. In addition, there appears to be no easy way to periodically clean the feed reservoir of extraneous materials that may enter during manual filling operations. While the option of using a float valve in the reservoir is discussed, such a valve would introduce tap water into the feed reservoir at tepid temperatures that would reduce carbonator performance. Such temperature increases would also increase dispensing losses as is known in the art. If the user was not sufficiently familiar with the system to add ice to the reservoir, he would perceive variations in levels of carbonation and in beverage quality using a system of this type.

The system described in the aforecited patent to Shikles, Jr. et al also has several other disadvantages. Cool water is held in a small coil wrapped around the carbonator. The coil size appears limitingly small and is in close proximity to the carbonator; hence, heat entering the system from tepid inlet water is easily transferred to the fluid in the carbonator. As a result, the recommended gas operating pressure is approximately 90–100 psi with the further disadvantages that the performance requirements and cost of the entire system are increased. Again, perceivable variations in the level of carbonation can be expected after a very few drinks have been withdrawn from the system. Further, this system requires four supply lines to enter the refrigerator. As an alternative, the supply unit could be placed inside the refrigerator. However, such arrangement takes significantly more storage space and further restricts food storage options for the user. Other considerations include use of a high-pressure pump and other electrical devices inside the refrigerator. Such devices are often costly and further require that electricity be routed to the inside of the refrigerator, an undesirable consideration in retrofit installations.

Additional beverage carbonation devices for operation in the home refrigerator have been described in the literature (see, for example, Berger, U.S. Pat. No. 4,440,318; Catillo U.S. Pat. No. 4,093,681; and Martonoffy U.S. Pat. No. 4,225,537). These devices commonly use a batch-type process for carbonation.

The soda and syrup dispensing apparatus described in the aforecited patent to Berger has some of the same space limiting features described previously. A further space limiting design factor is the carbon dioxide cylinder located in the same housing as the carbonator. Further disadvantages include the relatively cumbersome manual operations required to maintain the system and the waiting period of 5 to 6 hours to carbonate the volume of water. Other disadvantages include the excessive use of carbon dioxide often associated with patch-type systems. Since the gas-storage pressure cylinder is one of the most costly components of a home beverage system, the number of drinks produced by a given amount of carbon dioxide is an important consideration. Excess carbon dioxide usage translates into larger storage cylinders and higher initial costs for a given performance level; or, alternatively, a reduced number of drinks served for a given sized container of carbon dioxide. Since batch-type carbonators such as described in the patent to Berger require venting at the end of each cycle, they generally require more carbon dioxide per drink than carbonators of other designs. The modified batch-type carbonator described in the aforecited patent to Catillo provides an example of high carbon dioxide usage. As disclosed, a volume of carbon dioxide at 90 psig equal to the volume of liquid dispensed is vented during each fill cycle. Thus, the vented carbon dioxide alone is substantially greater than the amount required for good beverage quality. Still another disadvantage encountered in the system disclosed by Catillo is the need for electricity to power the valving system of the device. Additionally, the batch-type carbonator disclosed in the aforecited patent to Martonoffy appears to be more conservative of gas than other batch-type designs, but is believed to supply only low-level carbonation at the end of each cycle and is understood to require frequent manual operations.

Other carbonating apparatus are also disclosed in the literature (See, for example, U.S. Pat. Nos. 4,656,933; 4,655,124; 4,597,509; 4,518,541; 4,475,448; 4,466,342; 4,316,409; 4,242,061; 4,222,825; 4,205,599; 4,173,178; 4,068,010; 3,761,066; 3,756,576; 3,926,102; 3,495,803; 3,408,053 3,397,870; 3,225,965; 2,798,135; 2,735,370; 2,604,310; 2,560,526 1,872,462; 1,115,980; 780,714; and 27,775).

OBJECTS OF THE INVENTION

Accordingly, it is an object of the present invention to provide an apparatus and method of carbonating beverages at lower fluid operating pressures.

It is another object of the present invention to reduce the horsepower requirement of the motor, the pressure generating capacity of the pump, and the overall physical dimensions and weight of the apparatus required to carbonate a given volume of liquid.

It is a further object of the present invention to provide a post-mix carbonator capable of using an all-plastic pump in ambient temperature carbonating applications.

It is yet another object of the present invention to provide an improved carbonation system, the pumping component of which can tolerate no-flow conditions for appreciable periods of time without damage.

It is still another object to provide an improved carbonation vessel, suitable for use in post-mix beverage applications which is formed of substantially plastic material and is less costly to produce.

It is a further object of the present invention to provide a reliable and efficient liquid level control means which can eliminate the need for wiring from the carbonator tank to the motor and provide an economically viable means to take advantage of low temperature, low pressure carbonation advantages.

It is still another object of the present invention to provide a low cost, carbonator for home beverage dispensing application capable of high on-line operating efficiency using municipal water pressure available in most metropolitan areas.

It is still another object of the present invention to provide a home refrigerator carbonator system which conserves use of carbon dioxide gas, which is easy to install in retrofit or original manufacture applications, which is space efficient within the refrigerator, which eliminates the need for high-pressure pumps in most domestic applications, which facilitates wiring and plumbing to the refrigerator installation, and which facilitates the making of a soft drink.

SUMMARY OF THE INVENTION

In accordance with the present invention, a carbonation pressure vessel incorporates a valve which operates only in substantially fully open and fully closed modes to reduce the pressure drop across the operating valve and thereby reduce the requisite operating pressures.

Such, a valve permits maximum use of available municipal water pressure to effect carbon dioxide solvation. In areas where the pressure is insufficient to effect adequate carbonation, a small booster pump may be easily added, and a pressure switch may be incorporated into a single unit allowing the pump and carbonator pressure vessel to be separated without the need for electrical wiring. Reduced operating pressures permit use of a lower-cost plastic pressure vessel and plastic water-supply precooler that can be conveniently stored within a refrigerator cabinet. Gas pressures and liquid levels within the pressure vessel are automatically controlled, and high carbonation efficiency is maintained by venting accumulated atmospheric gases via secondary solvation techniques. Carbonated water is withdrawn as needed from the pressure vessel and is dispensed in the manner of one embodiment that assures post mixing with flavored syrup in a container to produce a finished carbonated soft drink.

DESCRIPTION OF THE PREFERRED EMBODIMENT

Figure 1:
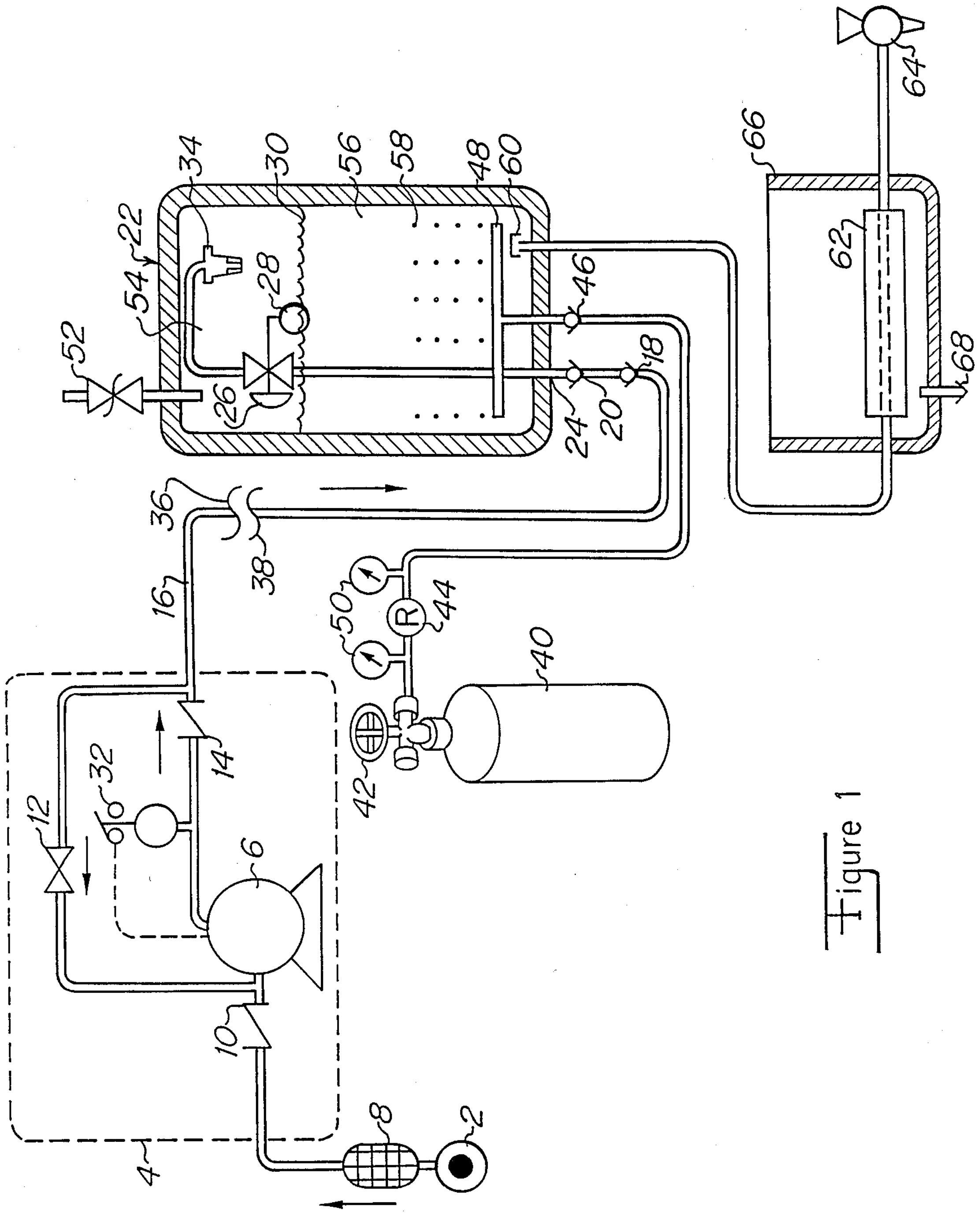
FIG. 1 is a fluid schematic of a preferred embodiment of the present invention in a typical post-mix beverage application.

Referring now to the fluid schematic diagram of FIG. 1, there is shown a carbonation system which embodies several aspects of the current invention. Water at ambient temperature from a source 2 enters pump assembly 4 and pump 6 via filter 8 and internal check valve 10. Although a number of different types of pumps may be used, one suitable pump is a diaphragm type such as described in U.S. Pat. No. 4,242,061. Such a pump can run dry for long periods of time, is designed for all plastic construction, and can withstand pressure on the inlet side of the pump. This last feature permits the pump to be used as a booster for line water pressure, thus minimizing the capacity and motor size required to deliver a given volume of fluid at any desired pressure. Pump assembly 4 can be eliminated if the pressure at source 2 if sufficiently high for the application. The pump 6, if used, may be equipped with a bypass valve 12 which is generally spring loaded to regulate and relieve excess pressure. The bypass valve 12, if provided, should recirculate a minimum amount of fluid since such recirculation requires pumping energy.

The pressurized fluid passes through internal check valve 14 to conduit 16 and subsequently through check valve 18 and check valve 20 to the interior of the carbonator designated generally as 22. Double check valves 18, 20 prevent reverse flow through the pump and may be required by certain municipal codes to protect the potable water supply. In a preferred embodiment, the check valves may be built into valve inlet port 24 of carbonator 22. Pressure vessel 22 is equipped with a mechanically-actuated diaphragm float valve 26 which includes a sensing element 28 mechanically linked to the body thereof. When the fluid level 30 and sensing element fall below a predetermined level, valve 26 opens, the pressure in conduit 16 falls to or below the pressure in the vessel and pressure switch 32 closes to supply electricity to pump 6. An important feature of this invention is that valve 26 operates only in full "on" or full "off" modes and offers a minimum of pressure drop resistance in the "on"-mode. In contrast, most mechanical float valves presently available utilize a liquid level-sensing element operatively connected to a device which seats around an orifice. An inherent characteristic of such valves is that effective orifice area and flow rate are a function of the position of the sensing element. In applications where a maximum fluid level shuts off the valve, the flow rate decreases and friction loss across the valve increases as the float approaches the maximum level. Such a characteristic is undesirable in carbonation applications, especially where inlet pressure is limited. Valves of this type are also prone to leak, which can be detrimental in carbonator applications. Thus, in the present invention, the full pressure of the fluid to be carbonated is immediately available at nozzle 34. Since friction loss of any kind is a key consideration, it is desirable that all piping systems be sized for substantially zero friction loss at the desired flow. When fluid level 30 and sensing element 28 rise to a predetermined level, valve 26 rapidly closes and the full flow of the fluid into the vessel abruptly ceases causing a rapid pressure rise in conduit 16. When pump assembly 4 is used, pressure switch 32 immediately deactivates pump 6.

An important feature of the system just described is the ability to separate pump assembly 4 from carbonator 22 anywhere along conduit 16. Break points 36 and 38 in the conduit 16 are shown to illustrate this feature.

Carbon dioxide is supplied to carbonator 22 from storage cylinder 40 through an isolation valve 42, pressure regulator 44, check valve 46, and diffuser element 48. The pressure in carbonator 22 is maintained by regulator 44 within the differential limits of the pressure drops caused by flow through the hydraulic devices and piping of the system. Pressure gages 50 register the pressure in storage cylinder 40 and the line to carbonator 22. Carbonation is brought about predominantly by one or more nozzles 34 that are disposed in carbonator 22 to direct the inlet water downwardly toward the liquid surface. As the liquid enters carbonator 22 and impinges upon the surface of the liquid 56, the gasses resident in gas space 54 become entrained in the body of liquid 56. In addition, diffuser element 48 introduces small bubbles 58 of carbon dioxide gas when the gas pressure in carbonator 22 falls below the predetermined level set on regulator 44. Carbonator 22 is equipped with a safety valve 52 to release pressure in the event of an overpressure condition. Carbonated liquid may be withdrawn from carbonator 22 through protected outlet 60 and dispensed through post-mix cooling and dispensing equipment. This equipment may include cold plate 62 and dispensing valve 64. The cold plate 62 is shown disposed within an ice storage container 66 that is provided with drain means 68 for removal of liquid water therefrom. Carbonator 22 may also be disposed in ice storage container 66 and supplied with cool and uncarbonated water from cooling plate 62. In accordance with the present invention, water will pass with little friction loss through pump 6 when valve 26 is open. Thus, if adequate supply pressure is available, the pump will not be activated and carbonation will take place under supply water pressure only.

Figure 2:
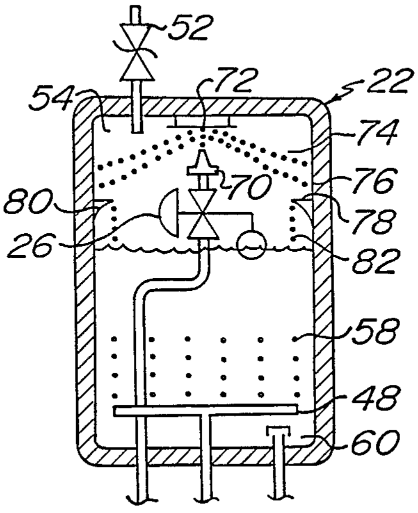
FIG. 2 is a schematic representation of the carbonator portion of the preferred embodiment of the present invention showing an alternate input fluid dispersing means.

Referring now to the schematic view of the carbonator in FIG. 2, there is shown an alternate inlet water dispersing means. Here, the water passes through a nozzle assembly 70 and is directed thereby to impact against a splash plate 72 located near the top center of carbonator 22. This causes the water to be broken up into a large number of droplets 74 with large aggregate liquid surface area. As the droplets expand through the atmosphere in the upper portion of carbonator 22, carbon dioxide is rapidly absorbed. Further carbonation takes place as the droplets impact the walls 76 of the vessel and drop by gravity along the walls and then into the body of liquid 56. An annular drip ring 78 having a concave cross section 80 may be installed to keep the fluid off the vessel walls. Secondary droplets 82 are formed at the ring and subsequently fall through the atmosphere of the vessel. Further solvation occurs when the secondary droplets 82 impact the body of liquid 56.

Carbonator efficiency directly affects the required gas and liquid operating pressures involved in the process. The following table indicates approximate gas operating pressures required to achieve a carbonation level of about 4.2 volumes of gas per volume of water in a carbonator operating at 23.9 degrees Celcius(neglecting the heat produced by the solvation process).

| Efficiency % | Carb. Gas Pres. Reg. @ 23.9 deg. C. |
|---|---|
| 100 | 66 |
| 95 | 70 |
| 90 | 74 |
| 85 | 79 |
| 80 | 85 |
| 75 | 92 |

Figure 6:
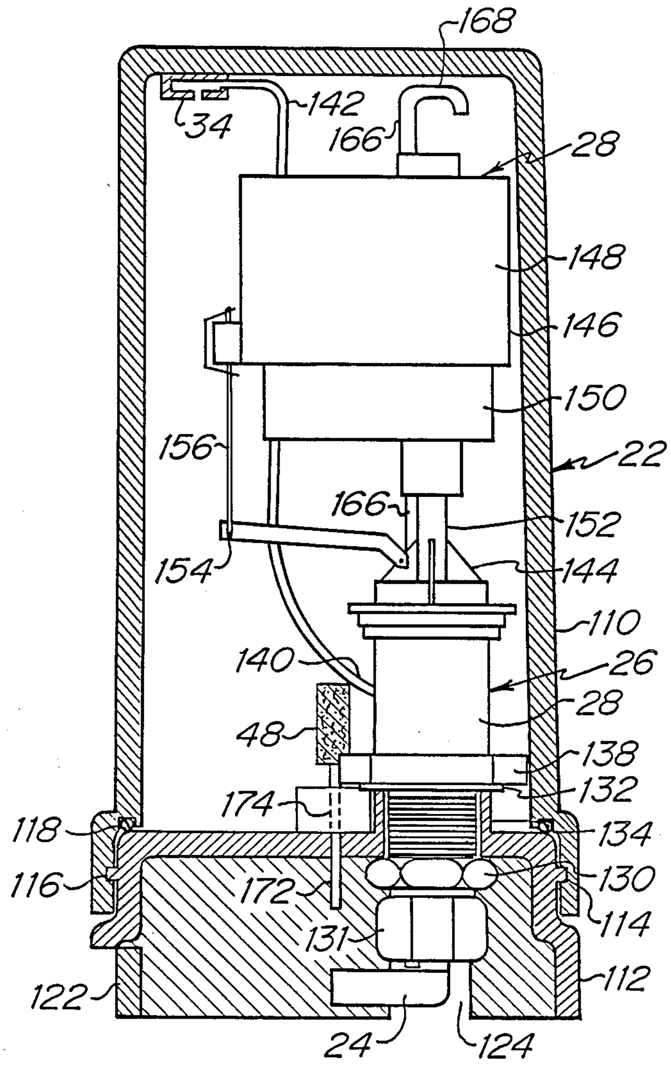
FIG. 6 is a sectional view of the pressure vessel and partial full view of the contents of the carbonator of FIG. 1.
Figure 8:
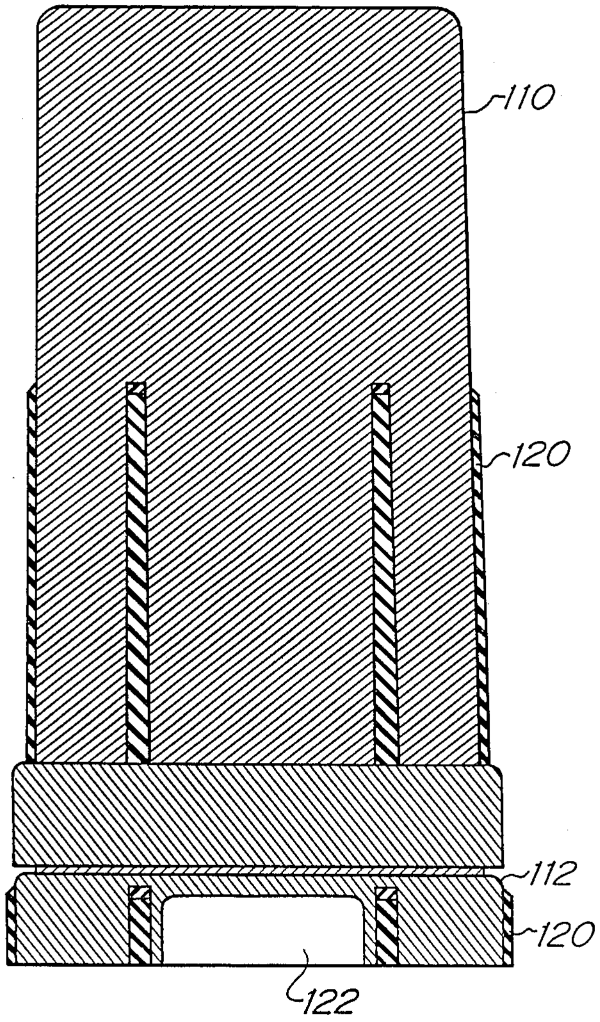
FIG. 8 is a full exterior view of the pressure vessel of FIG. 6 viewed from the perspective of lines II—II of FIG. 7.
Figure 9:
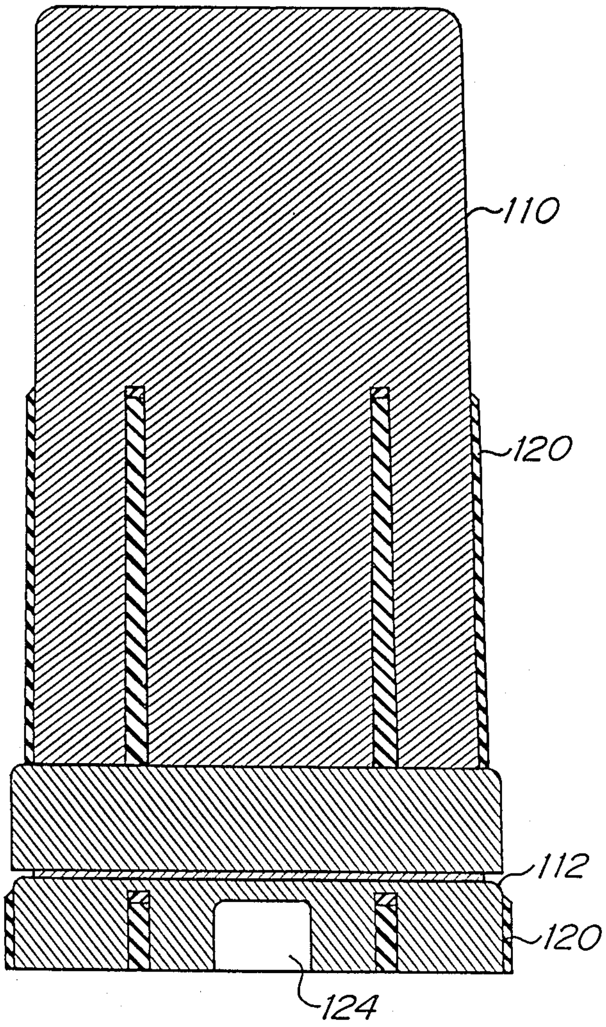
FIG. 9 is an exterior view of the pressure vessel of FIG. 6 viewed from the perspective of lines III—III of FIG. 7.

In order to achieve the objectives of the invention, it is necessary to define components and structures which create high levels of carbonating efficiency at low pressure differentials between the liquid supplied and the gas pressure maintained in the carbonator. Carbonation devices of a size suitable for post-mix applications have been tested for their relative effectiveness in dissolving carbon dioxide gas in the water ejected through nozzle 34. It has been determined that the level of carbonation in the downwardly-directed nozzle configuration shown in FIG. 1 that the efficiency of operation can be improved by adjusting the flow characteristics of nozzle 34. More specifically, higher carbonation levels have been achieved with one or more nozzles 34 having blunt or plate-like orifices, as illustrated in FIG. 6, than with tapered nozzles. For a given flow and pressure, the plate-like orifice produces a slower velocity but larger diameter liquid stream. As presently understood, the liquid stream from a blunt-tip nozzle causes greater surface disturbance and increased bubble density in and penetration of the body of liquid 56.

It has also been determined that for specific, typical flow rates of about 0.51 gpm and about 4.8 psi pressure drop across nozzle 34, the carbonation efficiency is greater using a blunt-tip nozzle compared with a tapered nozzle.

Additionally, it has been determined that greater carbonation efficiency is achieved by maintaining the distance between nozzle 34 and liquid surface of about 2″, or more. A carbonator vessel operating at 80 psi gas pressure and having a 4″ diameter was tested using a blunt-tip orifice nozzle 34 with a coefficient of discharge of about 0.70. The carbonator vessel was operated with an inlet flow rate of 1.2 gpm, an output temperature of 18.3 degrees Celcius, and a pressure drop of approximately 8 psi across the blunt-tip nozzle (the carbonation level was tested by titration under pressure against 1.0 normal sodium hydroxide). It has been observed that the efficiency of the carbonator may be fine tuned by adjusting the fill cycle of valve 26. Use of multiple nozzles at the same pressure differential across the nozzles gives similar performance to a single nozzle. The carbonation level achieved was 5.1 volumes compared to 5.8 volumes theoretically possible at equilibrium, for an overall efficiency of about 88.

Systematically high results were observed in the course of testing carbonator performance by the standard method of measuring the equilibrium pressure and temperature of a test sample. The effect is linked to atmospheric gasses moving from a dissolved state in the test sample into the small gas space allowed for sample shaking. Venting the test chamber yielded variable readings and rapid sample decarbonation, especially with samples tested at normal post-mix carbonating temperatures. The titration of a carbonator sample in a closed pressure vessel to a phenolphthalein end point gave repeatable and reliable results. The results reported by others for carbonator performance may be inaccurately high if the pressure/temperature test method was used, and dissolved atmospheric gasses are present in the inlet fluid.

It has also been determined that the carbonating efficiency of the post-mix carbonator according to the present invention appears to decrease with the total volume of fluid carbonated. This effect has been traced to dissolved atmospheric gasses in the supply water.

Municipal and private water supplies absorb such gasses from treatment prior to delivery to the domestic consumer. Municipal plants commonly aerate incoming water by allowing it to flow over graduated steps or by subjecting it to other cascading processes, and private water systems frequently use holding tanks under air pressure as a storage means prior to distribution. These latter systems are commonly used in high rise buildings to stabilize water pressures delivered to different floors. Such systems are often held at pressures of the order of 35 psi and, upon standing, can absorb over three times the amount of atmospheric gasses as possible through normal atmospheric aeration.

It has been determined that the effect of atmospheric gasses is substantial and more important than previously understood, and further that this effect has particular bearing upon on-line home carbonator systems.

It has further been determined that the carbonating efficiency of a newly vented carbonator is not appreciably affected by the level of dissolved atmospheric gasses in the input fluid, within the ranges normally encountered in potable water supplies. It has also been determined that the aforecited decrease in carbonator performance as a function of volumetric throughout follows a predictable course and stabilizes at a predictable level.

As currently understood, the solubility of each component of gas present during carbonation is directly proportional to the pressure of the gas above the liquid. This is a simplified statement of Henry's law and appears to be a good first approximation for effects observed. Conversely, a gas/liquid solution will move toward equilibrium by degassifying in absence of a partial pressure of the dissolved gas. The degassification process, like carbonation, is accelerated by creating large surface area contact with the atmosphere above the liquid. The agitation which takes place during carbonation is such a surface-area creating process. On start-up, a newly vented carbonator will degassify atmospheric gasses by surface area exposure, while independently dissolving carbon dioxide gas by exposure to the same surface-area contact. At least initially, when the carbonator is purged and started up, a large percentage of the air dissolved in the inlet water is driven out into the gas space above the liquid in the carbonator. The rate of degassification slows over time as the partial pressure of atmospheric gasses builds up in the gas space over the liquid in the carbonator. It has been determined that the partial pressure of atmospheric gasses builds up to a level which is in equilibrium with the atmospheric gasses in solution, displacing a like amount of carbon dioxide concurrently.

As presently understood, this displacement of carbon dioxide is responsible for the performance decline observed. The magnitude of the overall decline is directly related to the total amount of atmospheric gasses in the input fluid. This, in turn, can be linked to the temperature and pressure at which the input fluid is aerated and is further controlled by surface area exposure and contact time with the air.

It can be shown by application of the above principles that low-pressure carbonation is more sensitive to dissolved-air performance decreases (on a percentage basis) than is high-pressure carbonation. Further, low-temperature carbonation is more sensitive to dissolved air performance decreases than is high-temperature carbonation. The latter effect is due to the steeper slope of the solubility curve for carbon dioxide in water compared with the corresponding curves of the individual atmospheric gasses in the range normally encountered in beverage applications.

In practice, the build-up of atmospheric gasses and corresponding performance decrease is quite rapid in carbonators of the size typically used for post-mix soda-fountain application. As little as 10 gallons total throughput of inlet water produces near equilibrium, and performance declines. Thus, the recommended monthly venting of such systems is appropriate only for the smallest throughput amounts.

The problem of controlling carbonation level is a frequent failing of contemporary in-home carbonation systems. The inability of many prior art devices to deal with the dissolved air problem diminishes their utility in areas where inlet water includes high levels of dissolved air. Neglecting the effects of atmospheric gasses and the vapor pressure of water, a simplified approximate model of carbonator performance as a function of temperature can be generated:

| | CARBONATOR PERFORMANCE | | |
|---|---|---|---|
| Temp. °C. | Volumetric Absorption at Temp. T; (theoret.) 100% Efficiency | Volumetric Absorption at Temperature T; 90% Efficiency | "Volumes" at 6 ATM abs. Pressure; 100% Efficiency |
| 0° | 1.70 | 1.53 | 10.20 |
| 13° | 1.12 | 1.00 | 6.37 |
| 17° | 1.00 | .90 | 5.62 |
| 24° | .83 | .74 | 4.60 |

Where:
Volumetric absorption is the volume of gas at given temperature T (not reduced to 0° C.) and given pressure that can be incorporated into a given volume of uncarbonated water inside a carbonator. Within the ranges normally employed for beverage carbonation, the volumetric absorption of carbon dioxide is substantially independent of gas pressure; and Volumes refer to the measure of carbonation strength, as normally used in the art.

Although the volumetric absorption is constant at given temperature, carbonation strength increases in substantially linear proportion to the absolute pressure applied.

Note that Column 4 of the table cannot be calculated by simply multiplying 6 times the Column 2—except for the first entry. This is due to the temperature correction to 0° C. for all values in Column 4.

The above key reference points are selected as follows:

| | |
|---|---|
| 0° | Highest point on curve representing the practical limit for temperature induced solubility increases. |
| 13° | The point at which a carbonator operating at 90% efficiency will dissolve a volume of gas approximately equal to the volume of liquid entering. |
| 17° | The point at which a carbonator operating at 100% efficiency will dissolve a volume of gas approximately equal to the volume of liquid entering. |
| 24° | The highest summer water temperature encountered in most municipal water supplies. |

The problems of controlling carbonation level in the presence of dissolved atmospheric gasses in the inlet water are substantially resolved for warm carbonator applications in the manner described with reference to the simplified diagram of FIG. 3. The fluid level in carbonator 22 modulates between upper liquid level 84 and lower liquid level 86, as determined by suitable control means (not shown). These level limits define a liquid volume $V_1$. Another volume, $V_g$ is defined by upper liquid level 84 and the interior top surface 88 of carbonator 22. A simplified model of carbonator operation follows, where a volume $V_1$ is dispensed through valve 64 and then replaced by fluid from source 2.

As volume $V_1$ is being dispensed, the liquid level initially at upper liquid level 84 begins to fall. As this occurs, the gas pressure in gas space 90 momentarily drops below the setting on gas regulator 44. Gas then flows from storage cylinder 40 through open valve 42 and check valve 46 into the interior of pressure vessel 22. Thus, as the fluid level drops, the pressure in gas space 90 is maintained just slightly below the pressure set on gas regulator 44. In practice, a 1 to 2 psi operating differential is usual. Dispensing is assumed to stop as soon as lower liquid level 86 is reached. The liquid level control then allows water under pressure from source 2 to begin filling the carbonator vessel 22. The pressure in gas space 90 during filling depends on the temperature of the fluid and the efficiency (defined as % of theoretical carbon dioxide solubility) of the carbonator. Assuming a 90% efficiency and no dissolved atmospheric gasses, the approximate gas pressures can be tracked as a function of carbonating temperature as follows:

Case I. 0°

As water from source 2 enters the carbonator, the new volume of liquid $V_1$ entering will absorb about 1.53 volumes of gas. As a result, additional gas will continue to flow into the carbonator as the fluid level rises to upper liquid level 84. The pressure in gas space 90 will be slightly below the setting on gas regulator 44 during the fill cycle and will stabilize at the regulator pressure shortly after filling is complete.

Case II. 13° C.

As water from source 2 enters the carbonator, the volume of uncarbonated liquid, $V_1$ will absorb about 1.0 volume of gas. Thus, the volume of water entering will just absorb the volume of gas it replaces. No additional gas will enter the carbonator and the pressure in gas space 90 will remain stable at the regulator setting during the entire fill cycle.

Case III. 24° C.

As water from source 2 enters the carbonator, only about 74% of the gas in the displaced volume $V_e$ will be absorbed. Thus, the body of liquid 56 acts like a semipermeable piston to increase the pressure in gas space 90. The magnitude of the increase at the end of the fill cycle will depend on the ratio $V_g$:$V_1$ and the availability of pressure at Source 2.

The preceding discussion concerning volumetric absorption is based upon temperature. It should also be understood that volumetric absorption is adversely affected by accumulation of atmospheric gasses.

In one embodiment of the present invention that operates without refrigerated or precooled inlet water, carbonator 22 is selectively vented of excess pressure in response to a decrease in volumetric absorption of the inlet water. Such a change in volumetric absorption may be due to a temperature increase as previously described, or, alternatively may be due to an increase or accumulation of atmospheric gasses in gas space 90, as previously described.

Figure 3:
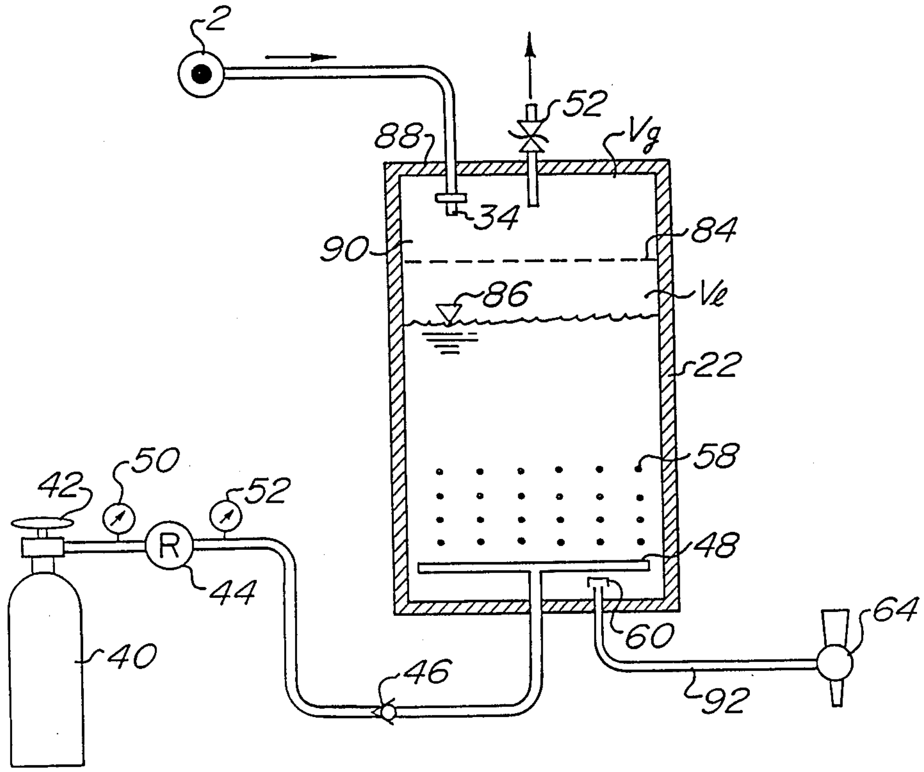
FIG. 3 is a schematic representation of elements of the carbonator portion of the present invention illustrating a preferred scheme for increasing carbonation efficiency.

Thus, again with reference to the sectional view of FIG. 3, a carbonator according to the present invention may in practice operate at about 85 psi gas pressure and about 100 psi liquid pressure and be provided with a relief valve 52 set at about 95 psi. Further, the ratio of $V_g$:$V_1$ may be selected to provide venting based on a selected level of volumetric absorption. The gas relief pressure setting is generally established at not more than 20–25 psi above the regulator pressure.

Figure 4:
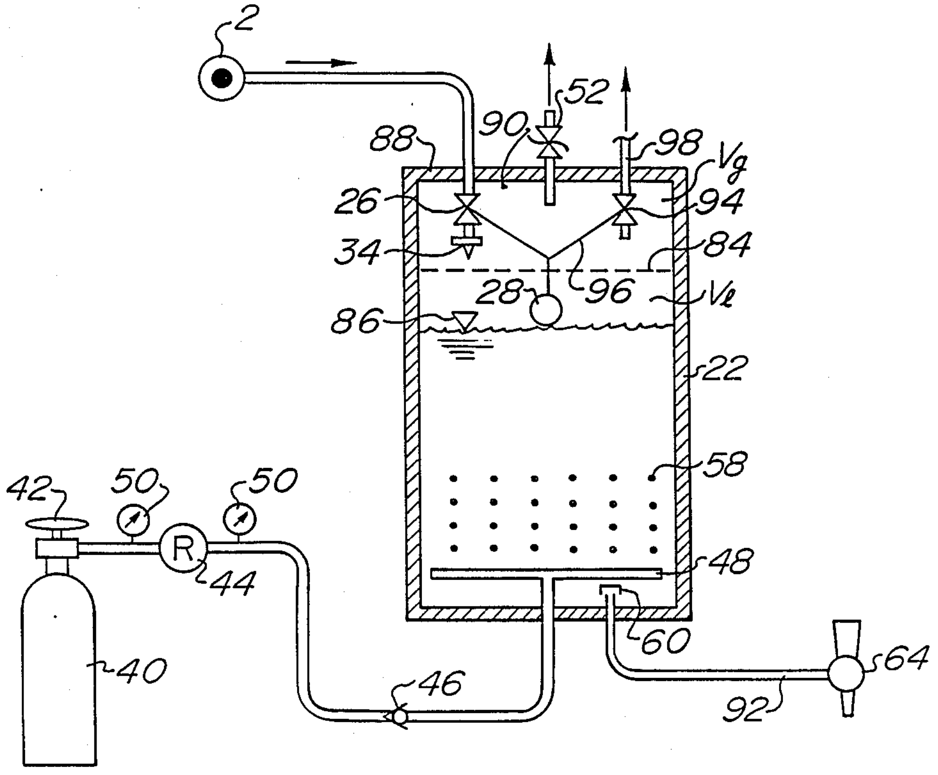
FIG. 4 is a schematic representation of elements of the carbonator portion of the present invention illustrating another scheme for increasing carbonation efficiency.

Referring now to the sectional view of FIG. 4, an alternate venting scheme is illustrated which is not tied to the volumetric absorption at which the carbonator 22 operates. Here, liquid sensing element 28 is operatively connected to a vent valve 94 via linkage 96. In operation, the vent valve 94 is actuated in response to the sensing element 28 or to actuation of valve 26. The flow through vent valve 94 is preferably restricted either mechanically or by timing means so that only a selected volume of gas is vented during each cycle. The ratio of liquid input to gas vented may in some cases be selected by this technique. This type of venting has advantage in cold carbonating applications where the embodiment of FIG. 3 is generally unusable.

Figure 5:
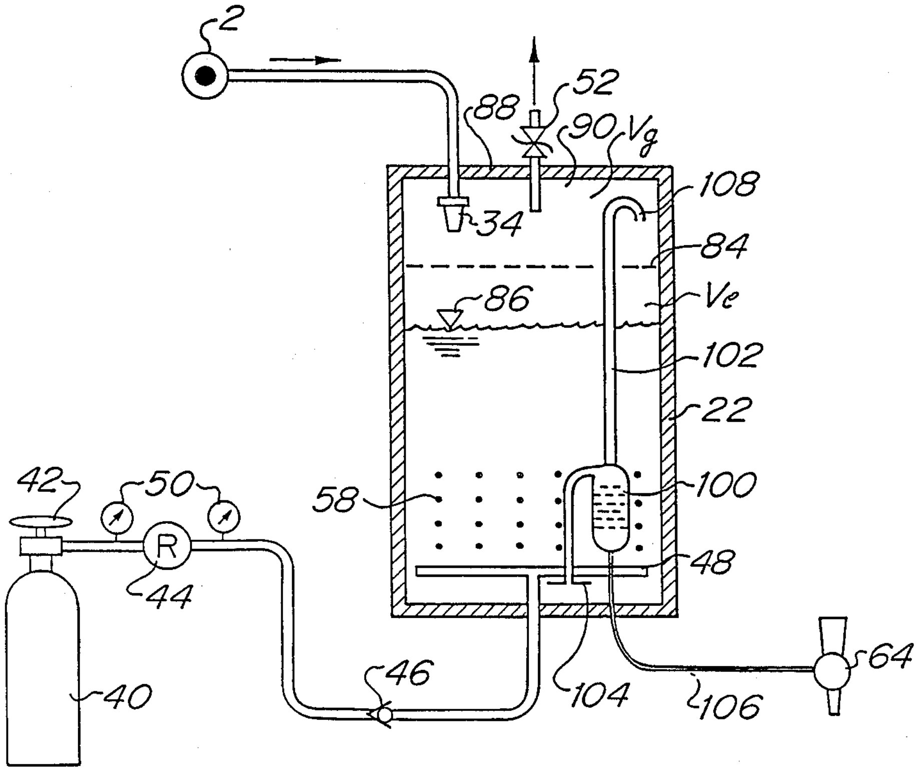
FIG. 5 is a schematic representation of elements of the carbonator portion of the present invention showing an additional scheme for increasing carbonation efficiency.

In FIG. 5, there is shown an alternative venting scheme in which the gas in gas space 90 is vented in response to dispensing carbonated liquid from carbonator 22. In this embodiment, the gas in gas space 90 is vented through (or by other means responsive to the opening of) the dispensing valve 64. For example, dispensing valve 64 may include switch contacts for controlling a Solenoid-actuated valve disposed to vent gas in response to dispensing through valve 64. In FIG. 5, there is shown arranged, preferably inside carbonator 22, a homogenizing chamber 100 in communication with vent tube 102. The homogenizing chamber 100 is also connected to protected inlet tube 104. Upon opening of dispensing valve 64, gas from gas space 90 and liquid are mixed and dispensed through a choke line or otherwise restricted conduit 106. The ratio of gas and liquid entering homogenizing chamber 100 is preset by controlling the respective sizes of gas inlet orifice 108 and protected inlet tube 104. The homogenizing chamber 100 may include a series of fine screens and baffles which break up entering gas bubbles. Thus, a gas/liquid slurry is delivered to choke line 106. The restriction in choke line 106 allows a relatively slow, even expansion of the bubbles entrained in the liquid being dispensed. The decarbonation which normally takes place when large bubbles are dispensed with liquid through valve 64 is thus minimized.

FIGS. 6–11 are more detailed sectional views of aspects of carbonator 22 of FIG. 1. Carbonator 22 includes a shell 110 and a base 112, both molded of a plastic material such as polycarbonate (or other plastic material that is approved for contact with food stuffs and that exhibits a ductile failure mode). The two pieces matingly join together by male thread 114 formed in base 112 and female thread 116 formed in shell 110. A fluid-tight seal against O-ring 118 is formed when male thread 114 is fully engaged in female thread 116. Grips 120 are formed on both base 112 and shell 110. The base includes a supply line port 122 to facilitate routing of lines into the connections on the underside. A second port 124 allows finger access to a safety valve (not shown) which incorporates a finger tab for manual venting. Valve 26 operates only in substantially fully open and fully closed conditions in response to level-sensing element 28. Suitable valves of this type are described, for example, in U.S. Pat. No. 3,495,803. This valve 26 includes a valve body 128 which fastens to base 112 of carbonator 22 by means of a fastening nut 130. Inlet port 24 is fastened to valve 26 by means of compression nut 131. An air and liquid tight seal is formed as gasket 132 is compressed against fluid inlet riser 134 of base 112 when nut 130 is tightened. A stainless steel locating ring 136 having an ear portion 138 is fastened around valve body 128 to limit rotation of the valve body 128 and other components inside carbonator 22. Valve body 128 includes a nipple outlet 140 which attaches to inlet tube 142 which, in turn, is connected to nozzle 34.

A diaphragm and float assembly 144 mates with valve body 128 by means of a quarter-turn, twist-lock engagement. Diaphragm and float assembly 144 includes a float 146 (which is one embodiment of a sensing element 28). Float 146 includes an upper cup 148 and a lower cup 150 which snap together and fit slidingly over mast 152 of diaphragm and float assembly 144. Float 146 is connected to activating lever 154 by means of linkage 156.

Figure 7:
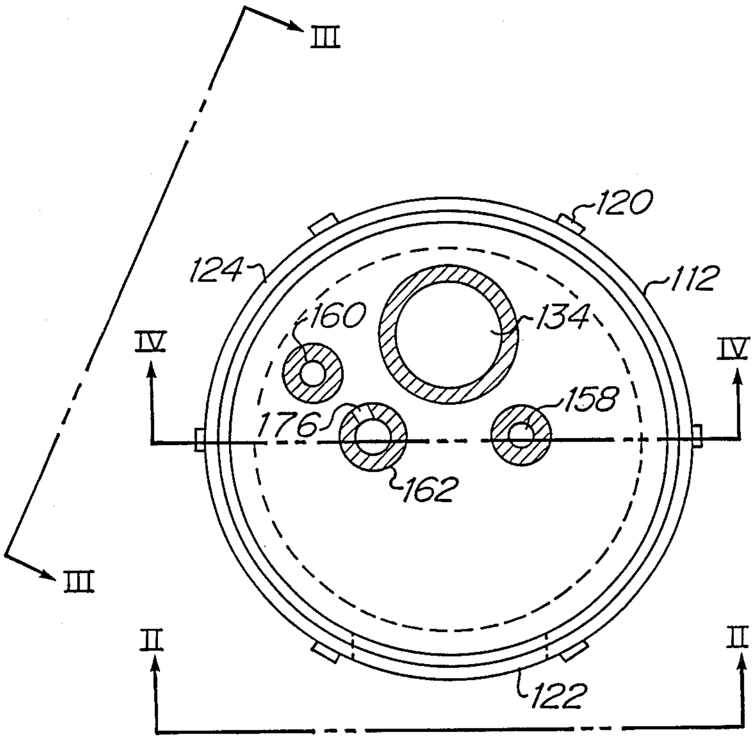
FIG. 7 is a top view of the carbonator base of FIG. 6 rotated 90 degrees counter clockwise around centerline I—I of FIG. 7.
Figure 10:
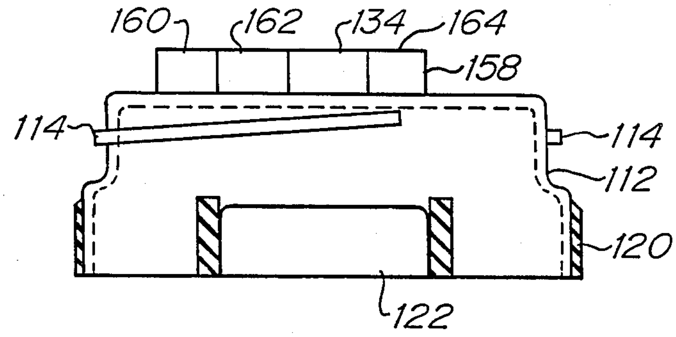
FIG. 10 is an exterior view of the carbonator base of FIG. 7 viewed from the perspective of lines II—II. Ports passing through the part are omitted for clarity.
Figure 12:
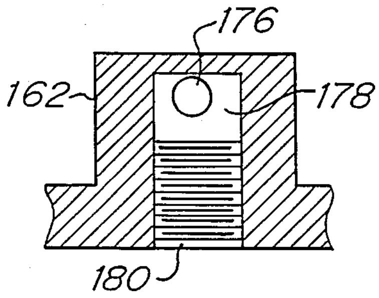
FIG. 12 is an enlarged sectional view of the soda outlet port of FIG. 11.
Figure 11:
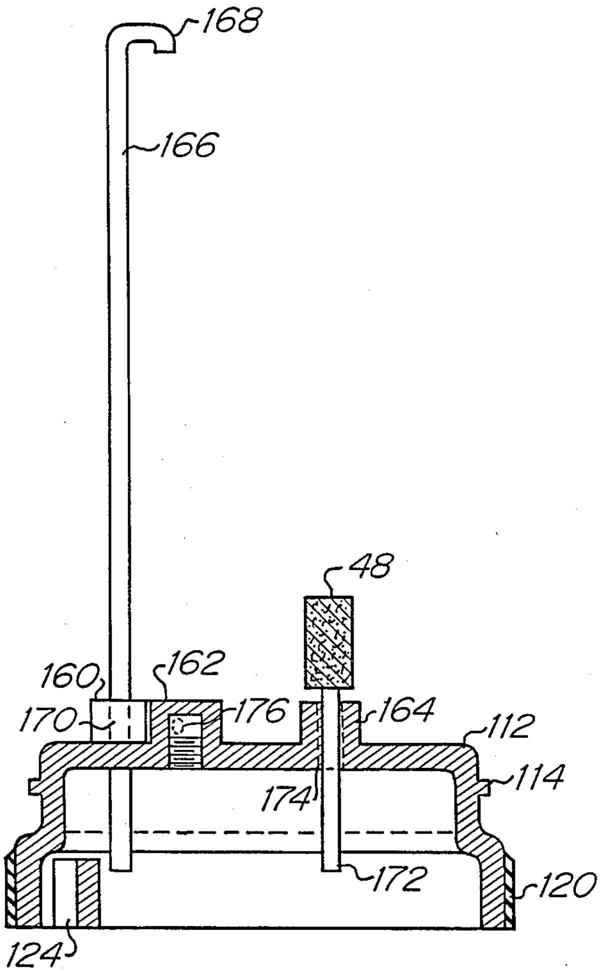
FIG. 11 is a sectional view of the carbonator base of FIG. 7 through lines IV—IV. The valve inlet port of FIG. 10 is omitted for clarity.

Referring to FIG. 10, the carbonator base 10 includes a plurality of risers 158 including specifically a fluid-inlet riser 134, a vent-tube riser 160, a carbonated fluid outlet riser 162, and gas-inlet riser 164. FIG. 7 shows top views of risers 134, 158, 160 and 162, and FIG. 11 shows a sectional view of risers 162 and 164. Inlet fluid riser 134 is omitted from the latter drawing for clarity. Vent tube riser 160 supports a vent tube 166 having a curved portion 168 thereof disposed above the maximum fluid level. Vent tube 166 includes a knurled portion 170 where it passes through vent-tube riser 160 to provide a secure seal through base 112. Similarly, gas-inlet tube 172 includes knurled portion 174 where it passes through gas-inlet riser 164 for the same purpose. FIG. 12 shows an enlarged view of fluid outlet riser 162 that includes an outlet orifice 176 which preferably faces away from alignment with the liquid stream ejected from nozzle 34. Outlet riser 162 also includes an interior hollow portion 178 and threaded port 180 to accommodate a fluid-tight fitting screwed into the threaded port 180 from outside carbonator base 112.

Substantially all of the available FDA-approved thermoplastics having ductile failure modes (such as polycarbonate) also have relatively high $CO_2$, vapor permeabilities. Although the rate of vapor transmission may not be a problem in many commercial applications, it can cause difficulty, for example, when the carbonator vessel 22 is submerged in cooling water that is not exchanged frequently or otherwise chemically buffered. Such water will become acidic and corrosive. In accordance with the present invention, the carbonator vessel 22 is formed of such an approved plastic and is coated additionally to form a vapor barrier thereon. A compound such as polyvinylidene chloride (PVdC) has been formed to create such a vapor barrier. The coating significantly reduces vapor transmission through the walls of the carbonator vessel 22 and may be applied to the interior or exterior surfaces thereof as an emulsion or latex suspension.

Figure 13:
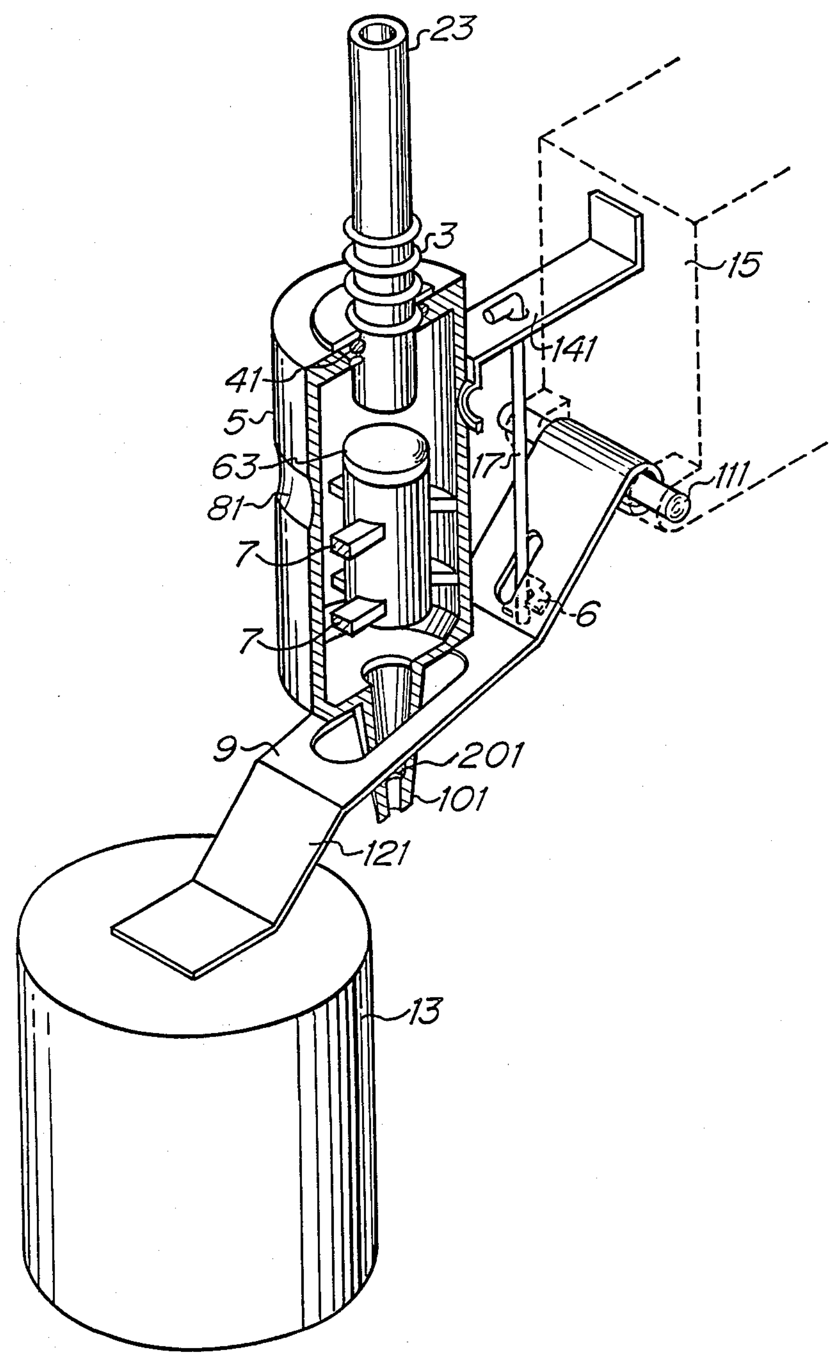
FIG. 13 is an isometric sectional view of the fluid inlet valve of FIG. 1 shown with the valve body sectioned.

Referring now to the sectional view of FIG. 13, there is shown another embodiment of an inlet valve for controlling flow of inlet water to the carbonator vessel 22. This valve includes a valve seat 63 that is secured by guides 7 to the interior of valve body 5 and the valve body 5 is linked to an actuating float 13 by pivoted linkage member 121. In operation, when the liquid level inside the vessel falls, float 13 falls and is aided by the action of spring 3. Valve body 5 moves down and inlet tube 23 unseats from valve seat 63. Normally when carbonated water is drawn from the vessel the rate of fall of liquid level in the carbonator vessel is quite fast, so the valve opens quickly. Water then enters the carbonator through nozzle 101. Nozzle 101 may include a blunted interior portion 201 which aids the afore cited increase in carbonator performance. The fall of float 13 is limited by detent member 141 which engages the indented portion 81 of valve body 5. The fall of valve body 5 is further limited by tie rod 17 so that valve body 5 cannot fully disengage from inlet tube 23. As the liquid level in the carbonator rises, float 13 remains in a stationary detent position until the buoyancy of the float overcomes the opposing force of the detent, and the valve then rapidly closes.

Figure 14:
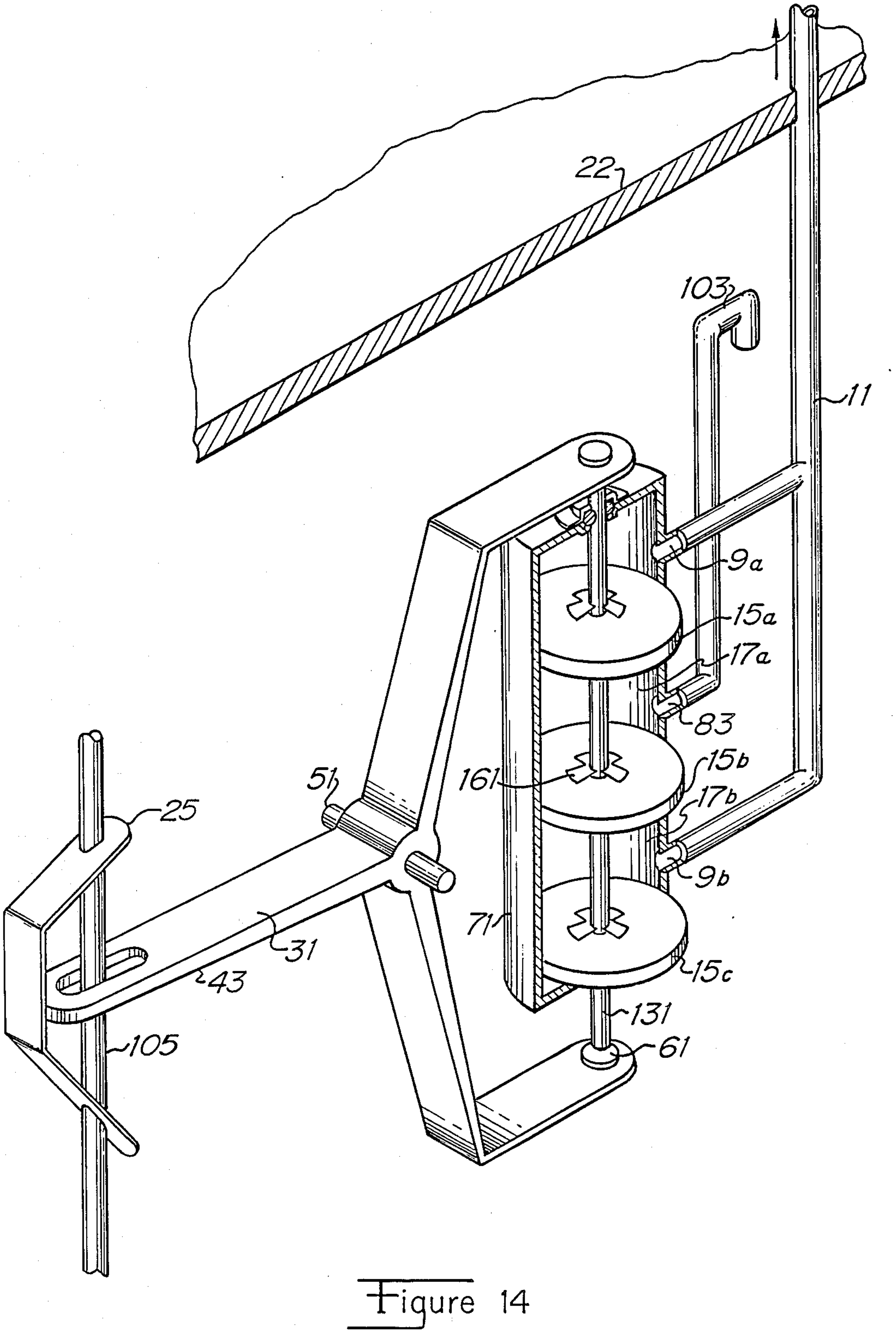
FIG. 14 is an isometric view of the mechanical venting valve of FIG. 4 with the valve body shown in full section.

Referring now to FIG. 14, there is shown a sectional view of venting valve for venting a specific volume of gas from within the carbonator vessel in each operating cycle. Specifically, the valve body 71 includes outlet ports 9*a*, 9*b*, 11 and an intermediate inlet port 83, 103, and also includes slidable pistons disposed on rod 131 that is actuated by the pivoted actuator 31 in response to the float tie rod 105 and positioning clip 25. In operation, the float tie rod moves up and down in response to float position (i.e., liquid level). On each rise and each fall of the float, the position of the pistons on rod 131 changes and the chambers of specific volumes formed thereby slide past ports 83, 9*a* and 9*b*. A volume of gas equal to the volume of chambers 17*a* and 17*b* will thus be vented each time the float (not shown) moves with the water level through selected levels in the carbonator vessel. In a preferred embodiment of the vent valve in FIG. 14, the Y-shaped actuator 31 is toggled by springs (not shown) to cause the valve to snap each time it changes position. This is desirable to prevent the chamber seals from lodging in the middle of inlet port 83 and outlet ports 9*a* and 9*b*. Such a condition could result if the fil! rate approximately equals the rate of withdrawal of carbonated liquid in the carbonator vessel.

Figure 15:
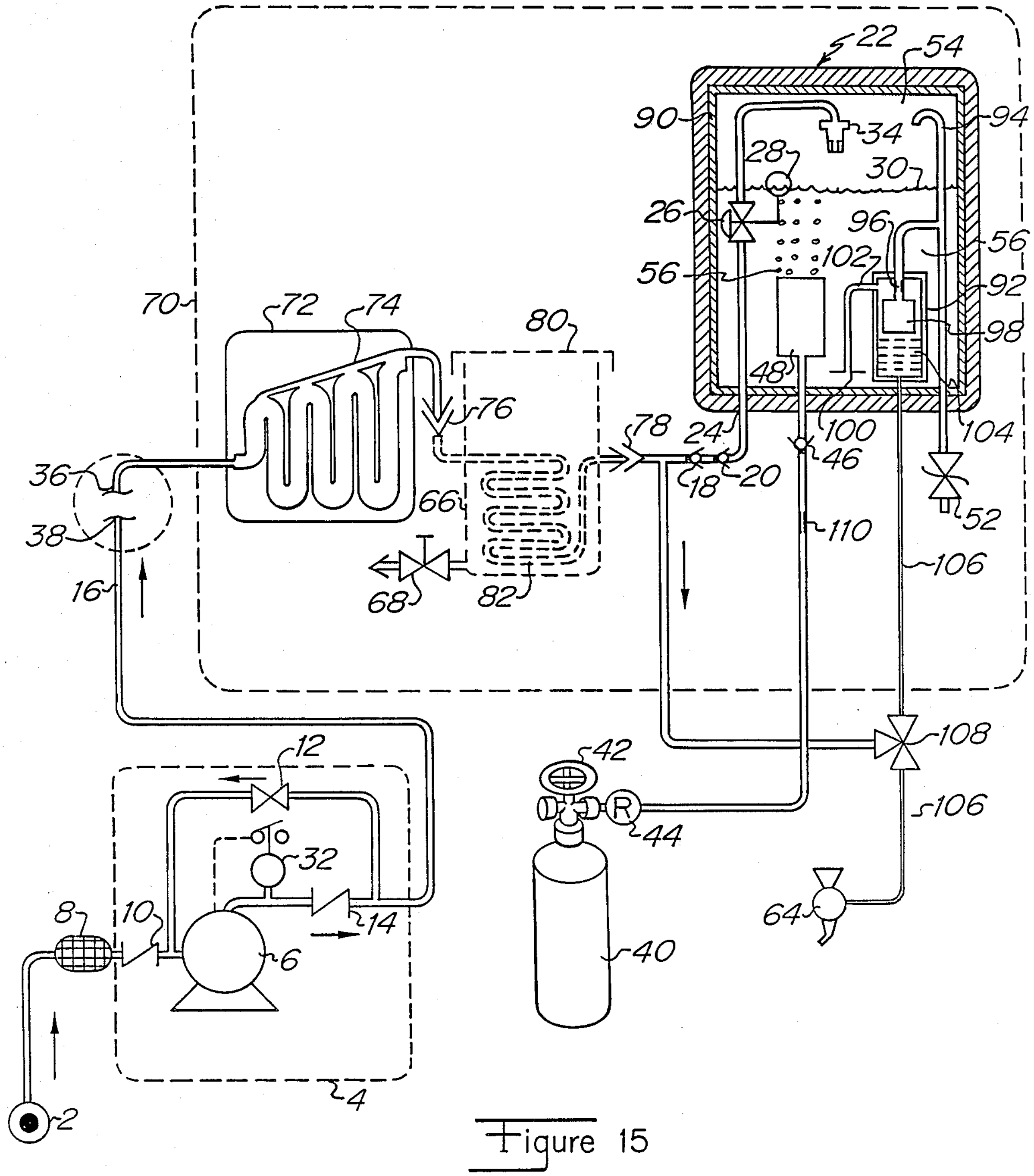
FIG. 15 is a fluid schematic of a preferred embodiment of the present invention for use in a retrofit home refrigerator application.

Referring now to the schematic diagram of FIG. 15, there is shown a carbonator system according to a preferred embodiment of the invention which operates on source 2 of pressurized water. Inlet water from the source 2 is filtered 8 and, optionally, boosted in pressure by pump unit 4 of the type previously described for delivery via conduit 16 to plate-like water reservoir 72. This reservoir 72 is formed of plastic material, preferably having relatively high thermal transmission, to include a serpentine water channel that enhances the plug-like, serial flow of water therethrough.

Figure 19:
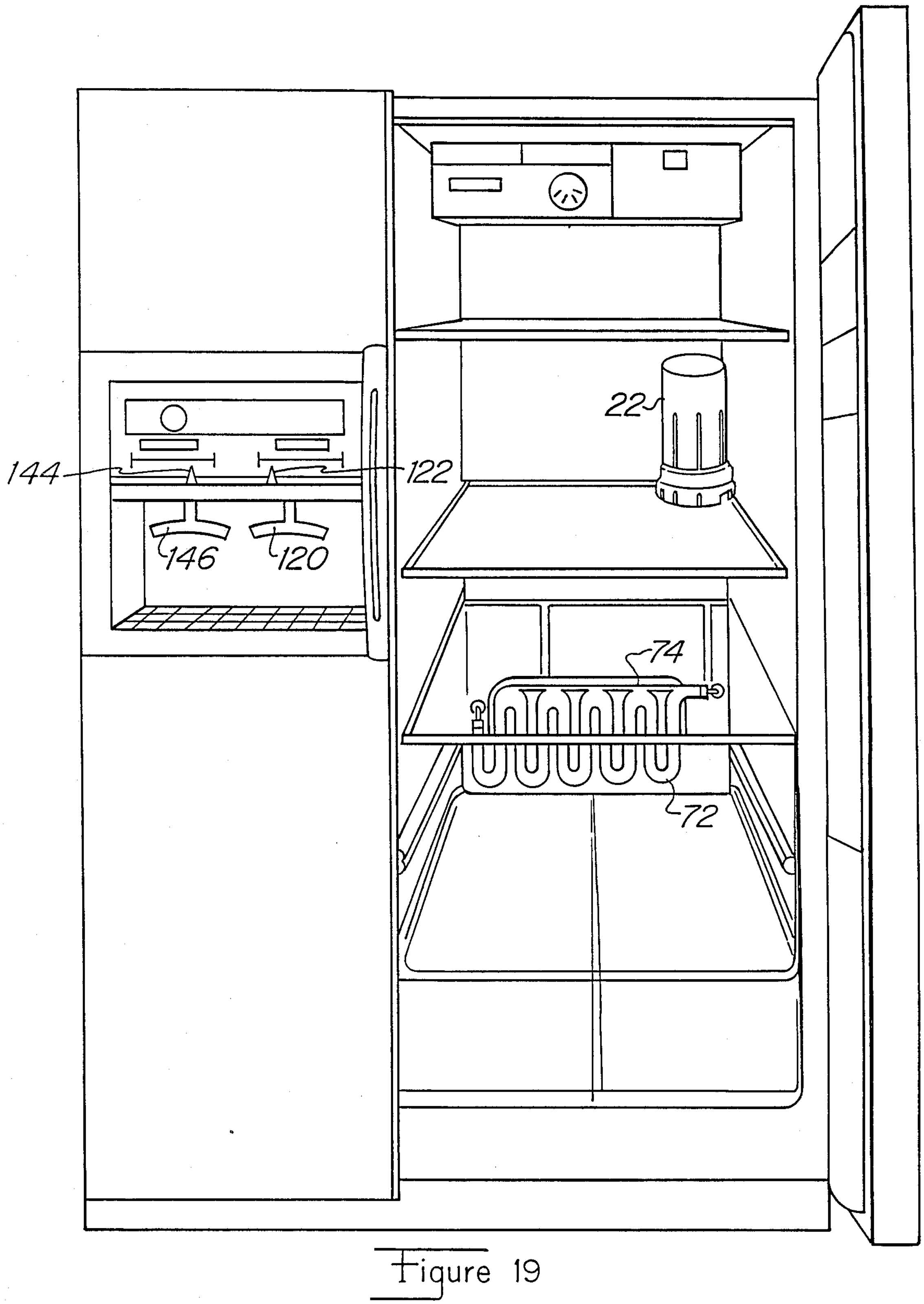
FIG. 19 is a view of the present invention in a built-in installation within a refrigerated cabinet.

A fluid passage 74 is coupled to the upper elbows of the serpentine path to promote rapid collection and passage of any gasses out of the reservoir. This reservoir 72 may be conveniently positioned in the back of a refrigerator cabinet, as shown in FIG. 19, to cool the inlet water supplied to the carbonator vessel 22. The inlet water may also be cooled by an ice-filled cooling unit 66 either as an alternative to reservoir 72 or as a supplemental cooler to increase the volumetric carbonation capacity of the system. Ice may be loaded into the housing through removable top 80, and water may be suitably drained via conduit 68 as the inlet water in cooling coil 82 exchanges heat and is reduced in temperature. Either or both of the reservoir 72 and unit 66 supply cool water directly to the dispensing valve 64 via selection valve 108, or through check valves 18, 20 to the inlet port 24 of the carbonator vessel 22. This vessel, as previously described, may be formed of plastic material such as polycarbonate and coated 90 with a gas-impervious material such as polyvinylidene chloride to inhibit the diffusion of carbon dioxide gas through the vessel walls. The vessel may also be housed in a refrigerator cabinet, as shown in FIG. 19. The inlet water is controlled via valve 26 of the full-on, full-off type previously described in response to the level 30 of water within the vessel. The inlet water is directed downwardly at the water surface via blunt nozzle 34 which is positioned at least 2 inches above the maximum water level.

Carbon dioxide gas contained under pressure within pressure vessel 40 is released through regulator 44 and choke line or restrictor 110 and check valve 46 and diffusing element 48 into the fluid in vessel 22. Carbon dioxide bubbles 56 through the water and accumulates within the vessel 22 in the space 54 above the water level until the fluid pressure in the vessel substantially equals the pressure level set by regulator 44. The choke or restrictor 110, as presently understood, aids in forming small bubbles 56 (with large ratios of surface area to volume) that remain in contact with the water longer for more efficient carbonation. Thus, cooled inlet water at pressure levels above the gas pressure set by regulator 44 is introduced into the vessel 22 under control, for example, of a level-responsive valve 26, and the fluid pressure within the vessel is controlled by the regulator 44 as carbon dioxide gas is absorbed by the water in vessel 22.

The outlet system of the present invention includes an homogenizing chamber 92 that is connected to vent tube 94 which also serves as a gas conduit to the pressure safety valve 52. A gas-flow restriction 96 is included in the gas line entering the homogenizer chamber 92 to limit the amount of gas that is vented during dispensing. The gas entering the chamber 92 (including accumulated atmospheric gasses and carbon dioxide) passes into diffuser 98 where it is combined with water that enters the chamber through the protected inlet 100. The inlet tube 102 has reduced internal cross section to form a predetermined pressure drop at the dispensing flow rate. This pressure differential is the basis for introducing gasses into the chamber 92 via the tube 94. A plurality of fine screens and baffles 104 are disposed down stream of the diffuser 98 and inlet 100, 102 to form a slurry-like fluid containing dissolved $CO_2$, and finely-divided bubbles of undissolved gasses. The outlet conduit from chamber 92 includes a choke or flow restrictor 106 to provide desired flow conditions through the selector valve 108 and dispenser valve 64. Of course, the selector and dispenser valves may be conveniently consolidated into the same unit for easy selection of carbonated water or chilled water.

In operation, when carbonated fluid is withdrawn through dispensing valve 64, the fluid level in carbonator 22 falls. The pressure in the vessel will also fall allowing additional carbon dioxide to pass into the carbonator through regulator 44. Flow restrictor 110 is sized to create a slight time lag in the restabilization of the pressure in carbonator 22 (if the process were to stop at this point). Also, when the fluid level in carbonator 22 falls, sensing element 28 opens float valve 26. Chilled water from water reservoir 72 under pressure from source 2 (or pump assembly 4) enters carbonator 22 through nozzle 34. The nozzle 34 is preferably sized to permit a flow of about 12 oz. per minute at a pressure differential of about 5 psi. There are several advantages to lowering the flow in this system. First, slow flow allows the lines entering the refrigerator, as in FIG. 19, to be quite small. Second, slow flow creates minimum amounts of friction loss in domestic water systems, especially those equipped with pressure regulators. Third, such slow flow rates reduce the size and capacity of boosting pumps required in areas where municipal water pressure is insufficient. Of course, these components may be furnished in kit form for retrofitting a home refrigerator.

Figure 16:
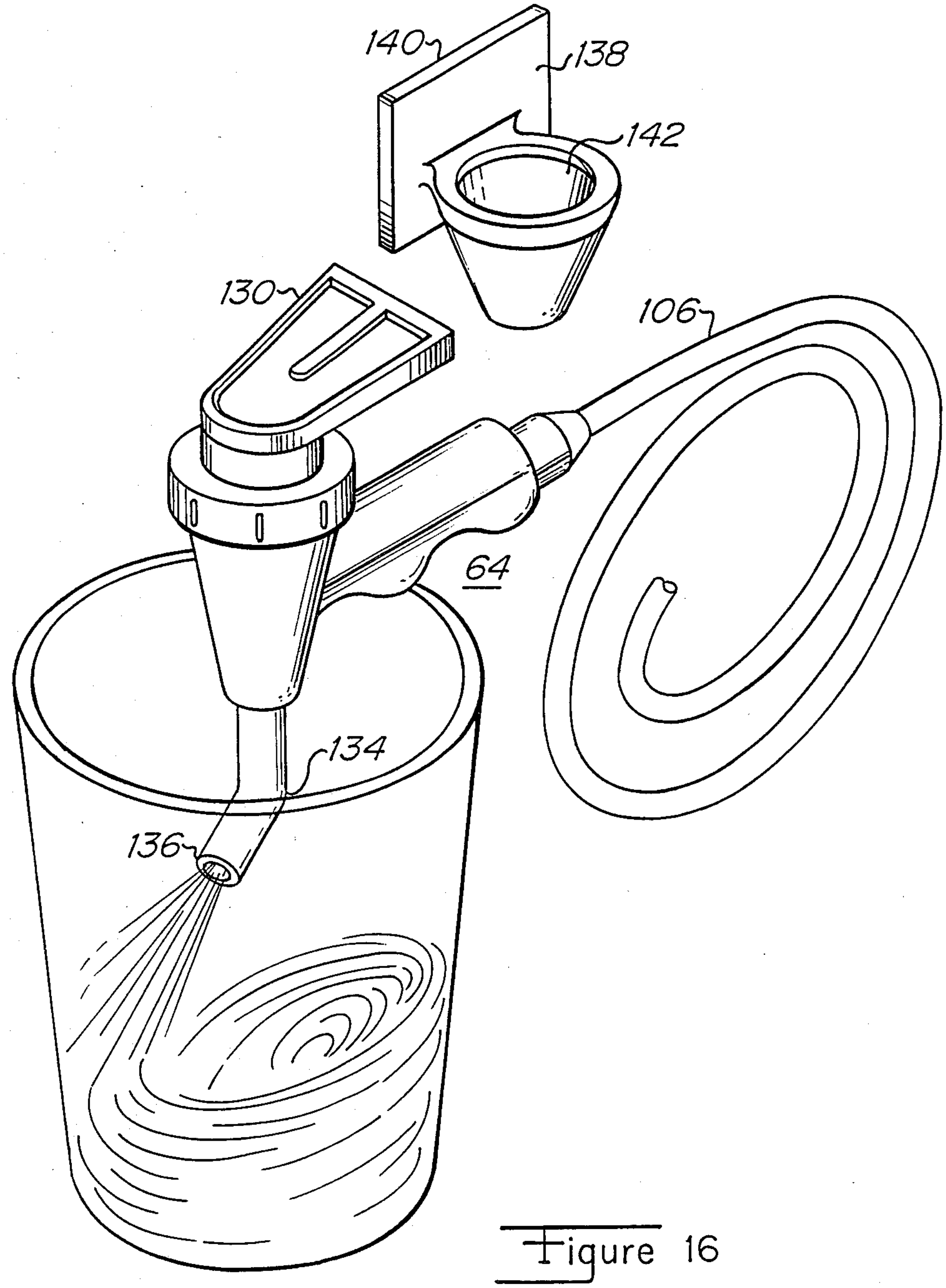
FIG. 16 is an enlarged view of the dispensing valve of FIG. 15.

In kit form, vessel 22 is supplied to be positioned in a remote corner of the refrigerator and liquid reservoir 72 is positioned against the lower section of the back wall. A dispensing valve 64, as illustrated in FIG. 16, is disposed in a holder 138 adhesively attached in a convenient location on an interior wall of the refrigerator. Alternatively, valve holder 138 and dispensing valve 64 may be placed on the outside of the refrigerator so that a drink may be made without opening the refrigerator door. Flexible conduit 106 may be fabricated to retain a permanent spiral so that when dispensing valve 64 is removed from valve holder 138, dispensing valve 64 is able to extend for some distance outside the refrigerator to dispense a drink. When dispensing valve 64 is placed back into holder 138, flexible conduit 106 returns automatically to a neat and compact coil.

In such application, a gas supply conduit 150 and liquid supply conduit may be routed to enter through the door seal or at the bottom of the refrigerator. For most applications, 3/16" and ¼" OD tubing for gas and liquid supply conduits adequate. Such sizes can easily pass through most door seals without significantly altering seal integrity. Gas and liquid supply conduits may be routed and held in position inside the refrigerator by pressure-sensitive conventional adhesive clips similar to those known and used to route wire and small cables in electronic equipment. The liquid supply conduit may be connected to the ice-maker supply source, if the latter is available and adequately sized.

In the embodiment shown in FIG. 19, the carbon dioxide storage cylinder 40 is placed outside the refrigerated cabinet and can be conveniently located in the vent space in back of the refrigerator, under the kitchen sink or other accessible location. Storage cylinder 40 may also be placed inside the refrigerator if desired or in a special compartment made for the purpose by the manufacturer.

Referring now to FIG. 16, there is shown a perspective view of the dispensing valve 64 with convenient manual actuator 130 and angled outlet tube 134 for connection via flexible liquid conduit 106 to the selector valve 108 of FIG. 15. The angled outlet tube greatly facilitates the mixing and swirling in the dispensed (carbonated) water of a quantity of flavored syrup predeposited in a container 142 which is then disposed be0eath the valve 64 to receive the dispensed water. As illustrated in FIG. 16, a drink cup or other container, having therein a preselected quantity of flavoring syrup, or other drink-flavoring material, disposed therein is positioned beneath the angled outlet tube 136 to dispense the carbonated (or uncarbonated) water into the cup and into the syrup therein in a swirling, post-mixing manner to prepare the finished drink without the need for a spoon or stirrer. Such a preselected quantity of flavoring syrup for convenient post-mix applications may be provided by sealing the syrup within the cup using manually-removable sealing means.

Figure 17:
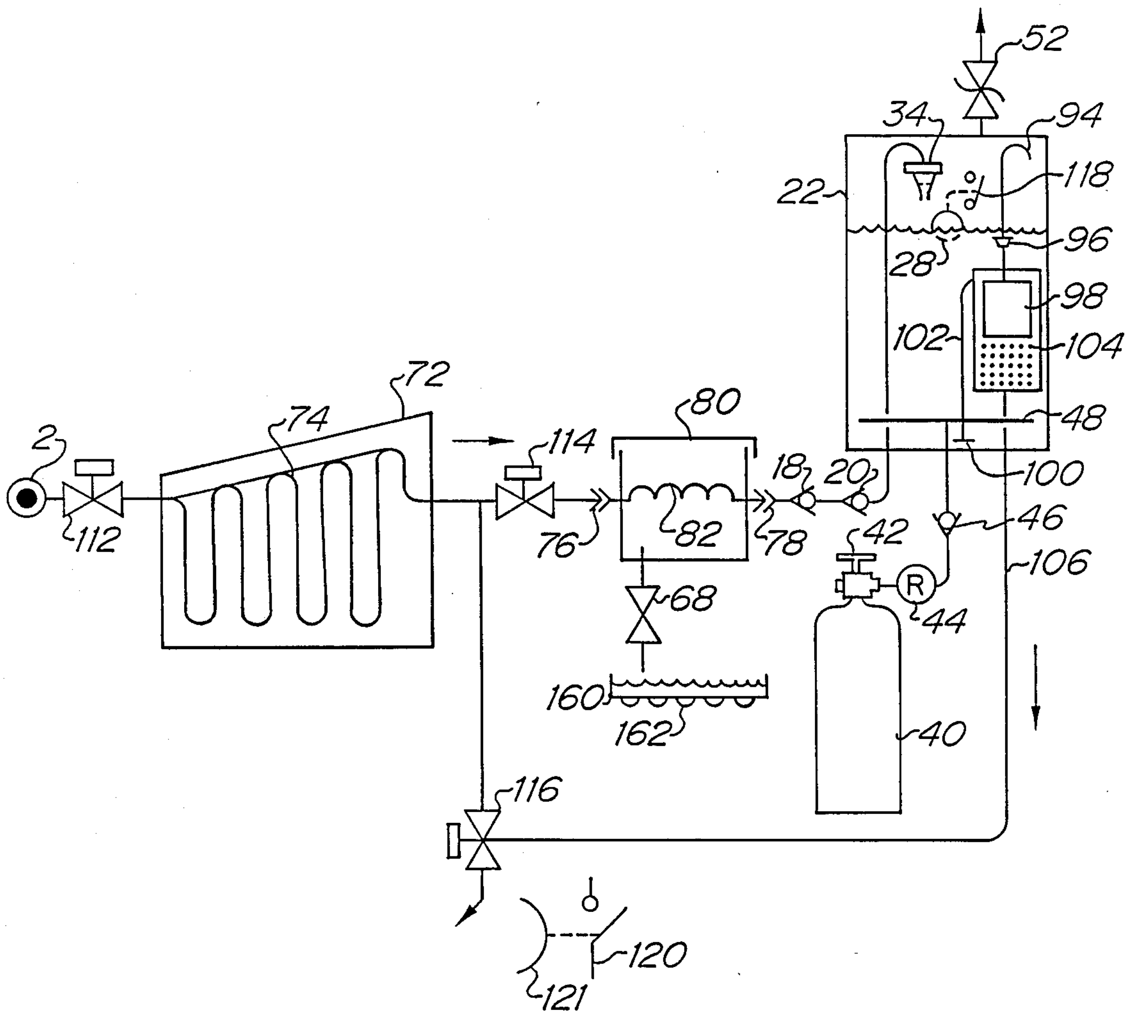
FIG. 17 is a fluid schematic of a preferred embodiment of the present invention suitable for original-manufacture installation in a refrigerator.

In FIG. 17, there is shown an alternative embodiment of the apparatus of FIG. 15 in an original equipment refrigerator application and which includes an electrically-activated dispensing valve 116 responsive to closure of switch 120 by activating lever 121, and an electrically-activated filler valve 114 responsive to the float switch 118. Chilled water or carbonated water may be dispensed through the same valve 116, depending upon the manual selection and the associated switch settings 122. Also in FIG. 17 there is shown one embodiment of the ice cooled cooling unit 66 of FIG. 15 wherein drain conduit 68 is operatively connected to the evaporator pan 160 of the refrigerator. Such pans are commonly located near condensing coils 162 to transfer heat thereto and promote rapid evaporation of defrost water. Drain conduit 68 may be placed at the bottom of cooling unit 66 or, alternatively, near the top thereof to drain liquid water into evaporator pan 160.

Ice may be added to cooling unit 66 either manually or automatically from the refrigerator ice maker. Management control of the carbonator cooling system can be easily accomplished with appropriately placed sensors. For example, control of ice delivery can be accomplished with an appropriately placed temperature, or wand-type ice sensor. Ice delivery can be inhibited if evaporator pan 160 becomes full as detected by an appropriately placed liquid sensor. An indicator light or message can further advise the consumer not to place any further ice in the cooling reservoir when the evaporator pan is full.

An advantage of cooling unit 66 is that properly configured, it is possible to provide cooler supply water to the carbonator and lower the gas and liquid operating requirements thereof. Of course, reservoir 72 may be placed in thermal communication with cooling unit 66 for this purpose.

Figure 18:
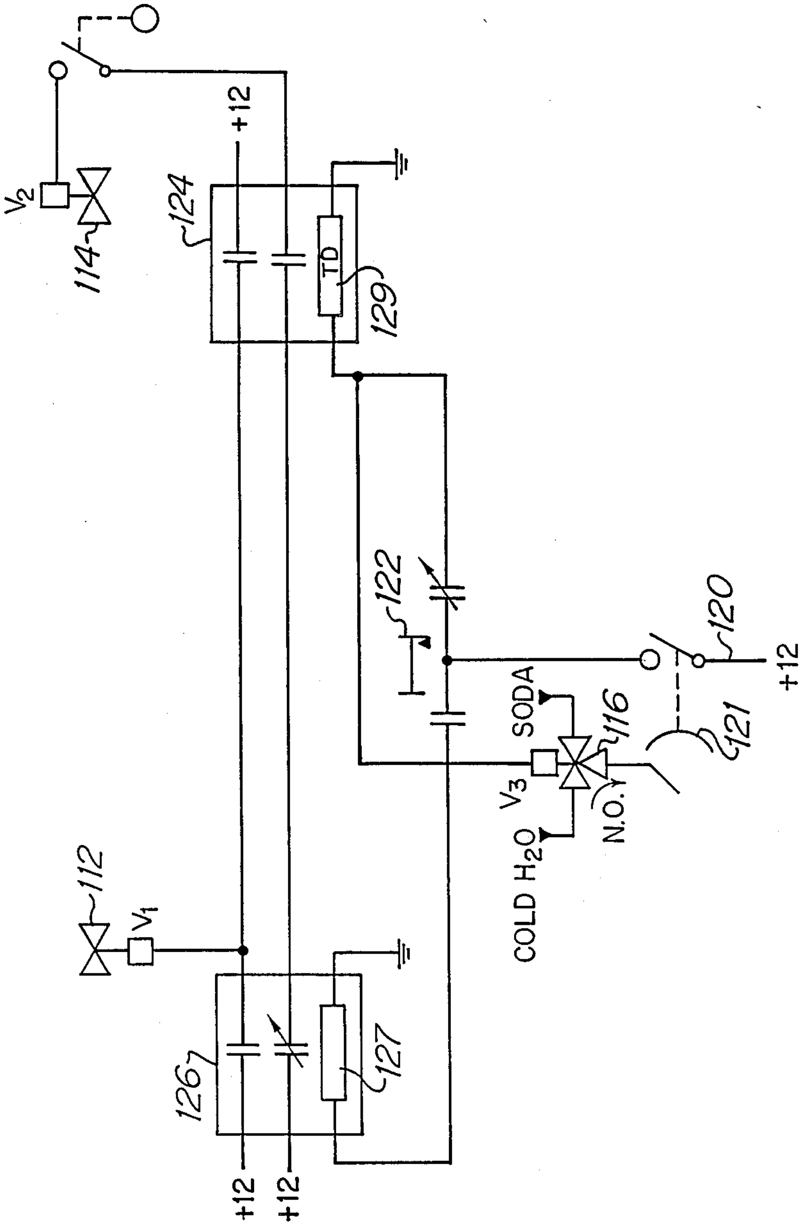
FIG. 18 is an electrical schematic diagram of the circuit for controlling the solenoid valves in FIG. 15.

FIG. 18 is a schematic diagram of the low-voltage circuitry used to control the electrically-activated valves. In addition, the relay 126 with coil 127 and time-delay relay 124 with delay coil 129 of conventional design control the actuation of the valves 112, 114, 116 in response to actuation of dispenser switch 120 and actuation of float switch 118. If a leak should develop downstream from valve 1, the time-delay relay 124 will time out and limit the flow.

Referring now to FIG. 19, there is shown a perspective view of the present invention installed as original equipment within a refrigerator, with the vessel 22 positioned in a remote corner and the liquid reservoir 72 positioned against the lower section of the back wall. A visual screen of translucent plastic may be positioned in front of the vessel 22 to obscure view of the vessel 22 when the refrigerator door is open. Selector and dispensing switches 120, 122 may be positioned in a recess within the door at a location adjacent the conventional ice dispenser and selector 144, 146. In a preferred original equipment embodiment of the present invention, carbonated water is dispensed from a tube or nozzle (not visible in FIG. 19) suitably disposed to create a swirling or mixing motion in the beverage container for facile mixing of a post mix soft drink.

The carbonator of the present invention operates about a point chosen on the càrbonator curve that is near realistic specifications for carbonation under anticipated worst-case operating conditions for the application. Under good carbonation conditions known in the art, about 4.2 volumes of carbon dioxide in the carbonator produces carbonated water of sufficient strength to withstand dilution with flavoring syrup. In ambient temperature carbonation applications, most municipal water supplies have a maximum water temperature (during the summer months) of about 23.9° C. This point can be selected as the worst-case temperature operating condition. Using carbon dioxide soluability curves, the approximate gas pressures needed to create this level of carbonation are listed in the following table. The values in this table have been adjusted to include the exothermic nature of the carbon dioxide solvation reaction which results in about a 0.9° C. temperature increase in the liquid at 4.2 volumes dissolved.

| Carbonation Efficiency | Carbonator Pressure (psi) |
|---|---|
| 100% | 66 |
| 95 | 70 |
| 90 | 74 |
| 85 | 79 |
| 80 | 85 |
| 75 | 92 |

In order to achieve adequate carbonation at the lowest possible liquid pressures, the carbonator is made highly efficient at very low pressure differential across the nozzle assembly. Also, the friction losses through the piping and other hydraulic devices have been reduced to preserve the pressure available to deliver water through the nozzle 34. The following table indicates the minimum efficiency requirements of a carbonator if inlet water at 100 psi liquid pressure is available. The center column shows the pressure drop available to create the required efficiency.

| Carbonator Pressure | Available Pressure Differential | Required Efficiency |
|---|---|---|
| 68 | 32 | 100% |
| 72 | 28 | 95 |
| 76 | 24 | 90 |
| 82 | 18 | 85 |
| 88 | 12 | 80 |
| 95 | 5 | 75 |

Similar tables can be generated for low temperature applications where the available water pressure, such as a municipal supply, is limited to much lower pressure levels.

Carbonators embodying elements of the present invention operating with single nozzles have achieved efficiencies as high as 88% (based on the temperature of the outlet fluid) at 8 psi pressure drop across the nozzle. Somewhat higher gas pressures and liquid pressure differentials may be required in field applications where safety margins and best case embodiments amy not be the most economically practical. A small commercial version of the present invention (suitable for use in ambient temperature carbonation applications) uses a small all-plastic pump to produce about 1.1 to 1.2 gallons per minute of carbonated water. The overall weight of the system is about 7–8 pounds and the pump consumes about 1.1 amperes at 115 volts AC.

A home refrigerator embodiment of the present invention uses a cooled water reservoir ahving a capacity of approximately 50 ounces and a carbonator having a liquid capacity of about 1.2 quarts. Once cooled, it produces 8 or more 8-ounce glasses of high quality carbonated water when supplied with 45 psi minimum liquid pressure (without the need for supplemental cooling equipment such as cooling unit 66).

Also, the carbonator of the present invention may operate to vent atmospheric gasses which come out of solution during carbonation. The effect of such venting depends on the amount of dissolved air in the inlet water, the operating pressure of the carbonator, the carbonation temperature, the cabonator efficiency, and the amount of gasses vented. The effect of venting a predetermined amount of gas from the carbonator along with the equilibrium partial pressures of atmospheric gasses in the carbonator may be estimated for any given set of inlet fluid and operating conditions by use of mathematical models based on the application of Henry's law and the solubility curves of the gasses present.

From a practical standpoint, the worst-case atmospheric gas condition largely determines the amount of gas to be vented, yet, as indicated, is subject to specific to carbonator operating conditions. For many applications using inlet water fully aerated at 1 atmosphere, venting of about 10% of the gas volume dispensed results in a significant reduction of atmospheric gasses in the carbonator with concomitant increase in carbonator performance. Additional venting is desirable to achieve near maximum benefits when greater amounts of atmospheric gasses are present.

We claim:

1. Carbonating apparatus comprising:
- a pressure vessel for containing a selected volume of liquid and gas therein;
- a liquid source means operatively coupled to said pressure vessel to supply liquid to be carbonated thereto;
- a liquid inlet disposed above the liquid surface inside said pressure vessel, said liquid inlet having at least one liquid nozzle oriented to direct incoming liquid to impact selected surfaces within the vessel;
- liquid level sensing means coupled to control said liquid source means to maintain a predetermined level of fluid in said pressure vessel;
- gas source means operatively coupled to said pressure vessel to supply carbon dioxide gas thereto;
- outlet means coupled to the interior of said pressure vessel for dispensing carbonated liquid therefrom; and
- means for venting a selected volume of gas from the space above the liquid inside said pressure vessel response to dispensing of carbonated liquid therefrom.

2. Carbonator apparatus as in claim 1 wherein said liquid inlet includes a plurality of liquid nozzles, each nozzle directing a single stream of liquid to impact the liquid surface inside said pressure vessel.

3. Carbonator apparatus comprising:
- a pressure vessel for containing a selected volume of liquid and gas therein;
- a liquid source means operatively coupled to said pressure vessel to supply liquid to be carbonated thereto;
- a liquid inlet disposed above the liquid surface inside said pressure vessel, said liquid inlet having at least one liquid nozzle oriented to direct incoming liquid to impact selected surfaces within the vessel;
- liquid level sensing means coupled to control said liquid source means to maintain a predetermined level of fluid in said pressure vessel;
- gas source means operatively coupled to said pressure vessel to supply carbon dioxide gas thereto;
- outlet means coupled to the interior of said pressure vessel for dispensing carbonating liquid therefrom, said outlet means being operatively coupled with additional carbonation means to further carbonate the fluid being dispensed; and
- means for venting a selected volume of gas from the space above the liquid inside said pressure vessel during dispensing of carbonated liquid therefrom.

4. Carbonator apparatus comprising:
- a pressure vessel for containing a selected volume of liquid and gas therein;
- a liquid source means operatively coupled to said pressure vessel to supply liquid to be carbonated thereto;
- a liquid inlet disposed above the liquid surface inside said pressure vessel, said liquid inlet having at least one liquid nozzle oriented to direct incoming liquid to impact selected surfaces within the vessel;
- liquid level sensing means coupled to control said liquid source means to maintain a predetermined level of fluid in said pressure vessel;
- gas means operatively coupled to said pressure vessel to supply carbon dioxide gas thereto;
- outlet means coupled to the interior of said pressure vessel for dispensing carbonated liquid therefrom;
- means for venting a selected volume of gas from the space above the liquid inside said pressure vessel during dispensing of carbonated liquid therefrom; and
- means operatively coupled to said outlet means to increase the number and decrease the size of any undissolved gas bubbles in the fluid being dispensed.

5. Carbonator apparatus comprising:
- a pressure vessel for containing a selected volume of liquid and gas therein;
- a liquid source means operatively coupled to said pressure vessel to supply liquid to be carbonated thereto;
- a liquid inlet disposed above the liquid surface inside said pressure vessel, said liquid inlet having at least one liquid nozzle oriented to direct incoming liquid to impact selected surfaces within the vessel;
- said liquid nozzle being oriented substantially downwardly and including means to reduce the coefficient of friction thereof in directing incoming liquid to impact the liquid surface inside the vessel;

liquid level sensing means coupled to control said liquid source means to maintain a predetermined level of fluid in said pressure vessel;

gas source means operatively coupled to said pressure vessel to supply carbon dioxide gas thereto;

outlet means coupled to the interior of said pressure vessel for dispensing carbonated liquid therefrom; and means for venting a selected volume of gas from the space above the liquid inside said pressure vessel during dispensing of carbonated liquid therefrom.

6. Carbonator apparatus as in claim 5 wherein the pressure drop across said liquid nozzle is less than 20 psi.

7. Carbonator apparatus as in claim 5 wherein the outlet of said nozzle ia at least two inches above the surface of the liquid in said pressure vessel.

8. Carbonator apparatus comprising a pressure vessel for containing a selected volume of liquid and gas therein;

liquid source means operatively coupled to said pressure vessel to supply liquid to be carbonated thereto;

a liquid inlet disposed above the liquid surface inside said pressure vessel, said liquid inlet having at least one liquid nozzle oriented to direct incoming liquid to impact selected surfaces within the vessel;

said liquid nozzle being oriented substantially downwardly and including means to reduce the coefficient of friction thereof in directing incoming liquid to impact the liquid surface inside the vessel;

liquid level sensing means coupled to control said liquid source means to maintain a predetermined level of liquid in said pressure vessel;

gas source means operatively coupled to said pressure vessel to supply carbon dioxide gas thereto;

outlet means coupled to, the interior of said pressure vessel for dispensing carbonated liquid therefrom; and means for selectively venting gas from the space above the liquid inside pressure vessel in response to an increase in the volumetric absorption of the liquid passing through said inlet.

9. Carbonator apparatus as in claim 8 wherein the pressure drop across said liquid nozzle is less than 20 psi.

10. Carbonator apparatus as in claim 8 wherein the outlet of said nozzle is at least two inches above the surface of the liquid in said pressure vessel.

11. Carbonating apparatus comprising:

a pressure vessel for containing a selected volume of liquid and gas therein;

liquid source means operatively coupled to said pressure vessel to supply liquid to be carbonated thereto;

a liquid inlet disposed above the liquid surface inside said pressure vessel, said liquid inlet having at least one liquid nozzle oriented to direct incoming liquid to impact selected surfaces within the vessel;

liquid level sensing means coupled to control said liquid source means to maintain a predetermined level of fluid in said pressure vessel;

gas source means operatively coupled to said pressure vessel to supply carbon dioxide gas thereto;

outlet means coupled to the interior of said pressure vessel for dispensing carbonated liquid therefrom; and means for venting a selected volume of gas from the space above the liquid inside said pressure vessel in response to a change in the liquid level therein.

12. Carbonator apparatus as in claim 11 wherein:

said liquid nozzle is oriented substantially downwardly and includes means to reduce the coefficient of friction thereof in directing incoming liquid to impact the liquid surface inside the vessel.

13. Carbonator apparatus as in claim 12 wherein the pressure drop across said liquid nozzle is less than 20 psi.

14. Carbonator apparatus as in claim 12 wherein the outlet of said nozzle is at least two inches above the surface of the liquid in said pressure vessel.

15. Carbonating apparatus as in claim 11 comprising:

valve means coupled between said liquid source means and said liquid inlet; and said liquid level sensing means is operatively connected to operate said valve means only in substantially fully open or completely closed conditions, said valve means operating in the open condition to admit liquid for liquid levels within the vessel below a selected level and operating in the closed conditions for liquid levels within the vessel above a selected level.

16. Carbonator apparatus as in claim 11 comprising:

pumping means couped between said liquid source means and said liquid inlet.

17. Carbonator apparatus comprising:

a pressure vessel for containing a selected volume of liquid and gas therein:

a liquid source operatively coupled to said pressure vessel to supply liquid to be carbonated thereto;

a liquid inlet above the liquid surface inside said pressure vessel, said liquid inlet having at least one liquid nozzle oriented to direct incoming liquid to impact selected surfaces within the vessel;

liquid level sensing means coupled to control said liquid source means to maintain a predetermined level of liquid in said pressure vessel;

gas source means operatively coupled to said pressure vessel to supply carbon dioxide thereto;

outlet means coupled to the interior of said pressure vessel for dispensing carbonated liquid therefrom; and said pressure vessel being formed of plastic material and including a layer of gas impervious material for inhibiting transmission of vapor therethrough;

said plastic material including a compound selected from the group of materials which exhibit ductile failure consisting of nylon, polyolefins, and polycarbonate; and said gas-impervious layer including polyvinylidene dichloride.

18. Carbonator apparatus as in claim 17 wherein:

said liquid nozzle is oriented substantially downwardly and includes means to reduce the coefficient of friction thereof in directing incoming liquid to impact the liquid surface inside the vessel.

19. Carbonator apparatus as in claim 18 wherein the pressure drop across said liquid nozzle is less than 20 psi.

20. Carbonator apparatus as in claim 18 wherein the outlet of said nozzle is at least two inches above the surface of the liquid in said pressure vessel.

21. A carbonator system comprising:

an elongated fluid conduit for receiving pressurized water;

a housing disposed about the fluid conduit for receiving a quantity of ice therein about the fluid conduit;

means connected to the housing for draining water therefrom;

means for disposing of the liquid water drained from said housing;

a carbonator tank operatively connected to said elongated fluid conduit;

sensor means disposed to detect the liquid level in said carbonator tank;

control means responsive to said sensor means to enable flow of pressurized water into said carbonator tank from the fluid conduit when the fluid level in the carbonator tank falls below a selected minimum level, and to disable said flow of pressurized water when the fluid level in the carbonator tank rises above a selected level;

dispensing means to withdraw carbonated liquid from said carbonator tank; and means to engage the withdrawn carbonated liquid in mixing relationship with a quantity of flavoring syrup disposed within a container into which the carbonated liquid is dispensed.

22. Carbonator apparatus comprising:

a carbonator tank containing a volume $V_L$ of liquid therein with a gas-space volume $V_g$ therein;

sensor means for detecting the liquid level in the carbonator tank;

control means responsive to the sensor means to enable substantially uninhibited flow of water into the carbonator tank from a source of water at a selected pressure level when the liquid level in the carbonator tank falls below a selected level, and to completely inhibit said flow of water when the liquid level therein rises above a selected level;

a source of carbon dioxide gas coupled to supply gas to the carbonator tank at a pressure less than said selected pressure level of the water;

relief means operatively disposed to vent gas from the gas space within the carbonator tank in response to decrease in the volumetric of absorption of carbon dioxide gas in the water within the carbonator tank; and dispensing means to selectively withdraw carbonated water from the carbonator tank.

23. Carbonator apparatus as in claim 22 wherein said selected pressure level is approximately 100 psi;

gas is supplied to the carbonator tank at approximately 85 psi; and said selected value of relief pressure is approximately 95 psi.

24. A carbonator system for a refrigerator comprising:

a carbonator tank to contain a volume of fluid therein, a closed fluid reservoir including a conduit therein disposed to support plug flow of liquid therethrough and having an outlet coupled to the carbonator tank and an inlet coupled to receive a source of pressurized water;

housing means disposed about said fluid reservoir for containing in contact therewith a quantity of coolant for cooling the liquid contained within said fluid reservoir;

drain means coupled to said housing means for removing liquid coolant therefrom;

said carbonator tank and fluid reservoir and housing means being disposed within the cooled space of a refrigerator which includes mechanical cooling apparatus including an evaporator and a liquid reservoir disposed in close proximity to said evaporator;

said drain means being connected to supply liquid coolant from said housing means to said liquid reservoir;

sensor means for detecting the liquid level in said carbonator tank;

control means responsive to said sensor means to enable substantially uninhibited flow of said pressurized water into said carbonator tank when the liquid level therein falls below a selected level, and to completely inhibit said flow when the liquid level therein rises above a selected level; and dispensing means to selectively withdraw carbonated liquid from said carbonator tank.

25. A carbonator system as in claim 24 comprising:

control means disposed to respond to the level of liquid in said liquid reservoir for selectively inhibiting the introduction of coolant into said housing means.

* * * * *